INVENTOR
ROBERT I. ROTH
BY Curtis Ailes Jr.
ATTORNEY

RANDOM MEMORY WITH ORDERED READ OUT

Filed March 2, 1962 15 Sheets-Sheet 6

June 22, 1965 R. I. ROTH 3,191,156

RANDOM MEMORY WITH ORDERED READ OUT

Filed March 2, 1962 15 Sheets-Sheet 7

RANDOM MEMORY WITH ORDERED READ OUT

Filed March 2, 1962

15 Sheets-Sheet 8

June 22, 1965 R. I. ROTH 3,191,156

RANDOM MEMORY WITH ORDERED READ OUT

Filed March 2, 1962 15 Sheets-Sheet 10

RANDOM MEMORY WITH ORDERED READ OUT

Filed March 2, 1962 15 Sheets-Sheet 15

United States Patent Office 3,191,156

Patented June 22, 1965

3,191,156

RANDOM MEMORY WITH ORDERED READ OUT

Robert I. Roth, Briarcliff Manor, N.Y., assignor to International Business Machines Corporation, New York, N.Y., a corporation of New York Filed Mar. 2, 1962, Ser. No. 176,958
16 Claims. (Cl. 340—172.5)

This invention relates to memory systems for the storage of data and information in which individual records may be stored at random within the memory but in which such individual records may be recalled or indicated rapidly, in a particular order, by a single interrogation of the memory for each record recalled.

In modern electronic computer technology, one or more data storage memories are usually required for the storage of data to be operated upon and for the storage of the computer program. The individual program instruction records and data records are generally accessible to the computer processing unit from the memory only in response to specific memory addresses. The use of specific addresses requires that the instruction and data records must be carefully stored in the memory spaces which are assigned such addresses, and in no other place. The addresses of the data and instruction records to be called forth must be stored in prior instruction or data records, or must be generated by the processing unit. In general, such computers operate in a mode which is similar to that which would be followed by an individual human in performing similar operations either on the basis of a set of instructions or on the basis of procedures previously learned and permanently stored in the human brain. Such operations might be characterized as "single track" since basically only a single step is accomplished at one time, even though the individual steps may be accomplished with extreme rapidity.

Various suggestions and inventions have been made for the purpose of avoiding the requirement of specific memory addresses for data and instruction "word" records in order to improve the efficiency of memory utilization. One class of these is referred to by the term "associative memories" in which data may be "addressed" or called for on the basis of information contained in all or a part of the record itself. This class of memories is very useful for many purposes. However, there is one important recurring operation required for data storage memories which is not conveniently and efficiently fulfilled either by the traditional memory systems or by the associative memory systems. This is the operation in which instruction or data records or words are to be called forth in an ordered sequence, and particularly if the sequence is not necessarily completely filled, that is, where there may be large numerical gaps in the sequence.

The traditional method for solving the problem of obtaining an ordered availability of data records is to provide for a physical sorting of such records such as by a numerical sorting of data cards. An analogous procedure is available with records stored upon magnetic tapes, in which records from two tapes are selectively transferred to a third tape to form sequences. This is repeated with two parts of the third tape data, and after a number of repetitions there is eventually produced a single tape with all records of the set physically sorted in the desired order. The present invention avoids the necessity for all such physical sorting.

It is one object of the present invention to provide a memory in which records may be stored at random and in which such records may be recalled from the memory for read out in order, or in an ordered sequence, without the necessity for any physical sorting or re-arrangement of records.

In an associative memory, access to the records in a particular order generally can be achieved only by a succession of individual interrogations of the memory. Each interrogation is based upon a request from the memory for a data record which matches the contents of an association register. Then, whether or not a record is made available as a result of such an interrogation, the association register must be incremented by one and the interrogation repeated. This operation has many disadvantages. For instance, if there are wide numerical gaps in the ordering field of the records, then many fruitless interrogations will be made between the successive reading out of individual records. Also, if more than one record contains the same number in the ordering field, the system must recognize this condition and make special provision for reading out only one of the recognized records and for discontinuing the incrementing of the contents of the association register until the other records having the same order number have also been read out.

Accordingly, it is another object of this invention to provide a memory system which is capable of storing records in random positions and of reading out such records automatically in order, or in an ordered sequence, without the necessity for associative interrogation of the ordering field of the records and with no delays for "blank" interrogations where gaps exist in the number sequence. Another object of the invention is to provide a memory system of the above description which does not require any special detection or change in mode of operation for the condition where two or more records have the same order number.

As mentioned above, all of the prior memory data storage systems rely basically upon a "one track" addressing or interrogation system.

It is another object of the present invention to provide a system which may be characterized as a multiple track interrogation system, combined in a memory system, which has the capability of simultaneously establishing a comparison of the ordering field of each word with the ordering field of every other word in the memory, and for indicating or reading out the word (or one of the words) having a selected extreme value (either the highest or the lowest) in the ordering field.

Another object of the invention is to provide a random memory with ordered read out which does not require any interrogation register.

Another object of the present invention is to provide a random memory with ordered read out in which the reading out of records proceeds in sequence to a predetermined limit value in the ordering field, and then automatically stops.

Another object of the present invention is to provide a random memory with ordered read out in accordance with any of the previous objects and including one or more memory fields in which an associative selection takes place so that the read out is based upon a combination of association and ordering.

Another object of the present invention is to provide a random memory with ordered read out according to one or more of the previous objects which is particularly well adapted for embodiment in cryogenic circuitry.

Various proposals have been made for computer systems having more than one arithmetic or processing unit. On of the most serious problems in such systems is to provide for an efficient flow of instructions and data to the various processing units. Some systems of this kind approach this problem by employing queuing memories for the purpose of temporarily storing information which is to be handled by a particular arithmetic unit. The information may be called out of the queuing memory for use on the basis of data stored within an ordering field.

Accordingly, it is another object of the present invention to provide a random memory with ordered read out which is particularly well adapted to provide the function of a queuing memory for a computer system employing more than one processing unit.

In carrying out the above objects of the invention in one preferred embodiment thereof there may be provided a memory system having automatic ordered read out of words including a plurality of binary storage flip-flops arranged in rows for the storage of individual words and having corresponding word flip-flops arranged in columns. An individual ordering control circuit is provided for each row, and each ordering control circuit includes a flip-flop condition detection circuit for each flip-flop in that row. The condition detection circuits are connected in cascade from the highest to the lowest order digit positions, and each has an input connection and two output connections for respectively indicating first and second conditions. The first condition may be the "zero" condition, and the second condition may be the "one" condition. The first of the condition output connections is connected to provide the input signal to any lower order condition detection circuit of the associated order control circuit. An "all second condition" detection circuit is provided for each column which is connected to respond to outputs from all of the active condition detection circuits for that column for indicating when all of the active detection circuits are in the second condition. A coincidence circuit is provided for each condition detection circuit which is connected to receive the second condition output signal therefrom, and all of the coincidence circuits are connected to receive the "all second condition" detection signal from the "all second condition" detection circuit of the associated column. Each coincidence circuit is operable to provide an output only in response to the concurrent presence of both of the above mentioned signals, and the output of each coincidence circuit is connected to supply a signal as an alternative to the first condition output of the associated condition detection circuit.

For a more complete understanding of the invention, reference should be made to the following description and the accompanying drawings as follows:

FIG. 1 which is composed of a combination of FIGS. 1*a*, 1*b*, and 1*c* is a schematic logical circuit diagram illustrating a preferred form of the invention.

FIG. 2 which is composed of a combination of FIGS. 2*a*, 2*b*, and 2*c* is a schematic circuit diagram of a simple relay embodiment of the invention.

Figure 5:
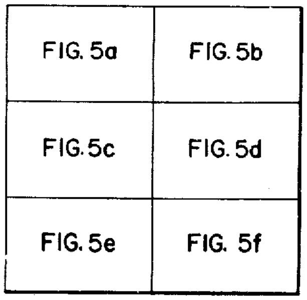

FIG. 5, which is composed of a combination of FIGS. 5*a* through 5*f*, is a schematic circuit diagram of a cryogenic embodiment of the present invention.

Figure 6:
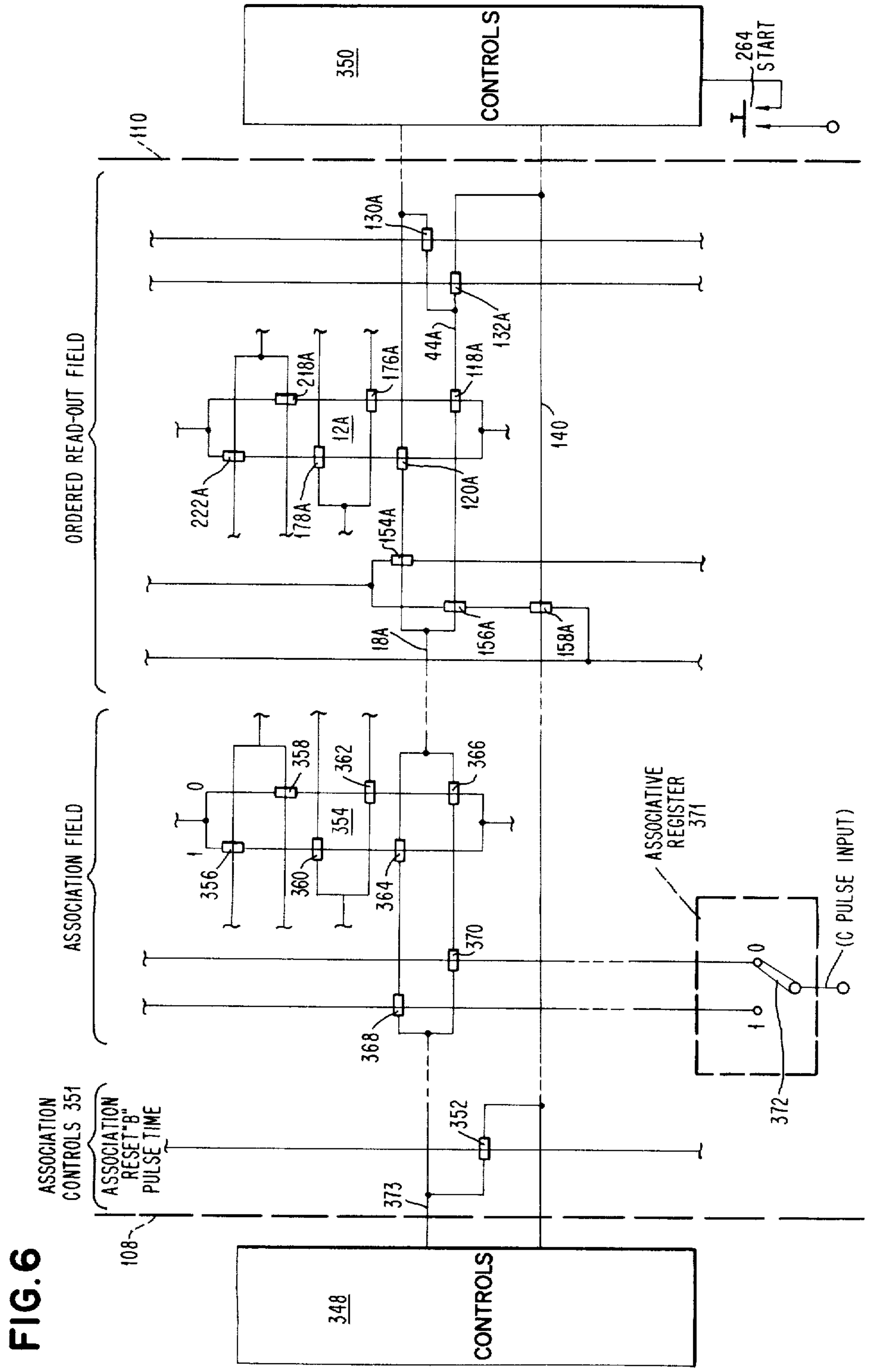

FIG. 6 is an abbreviated schematic diagram showing how certain columns in the memory may be constructed for selection of words by association while in other columns the selection is on the basis of relative numerical value, as described above, so that selection of individual words is based upon a combination of association and relative numerical value.

Figure 3:
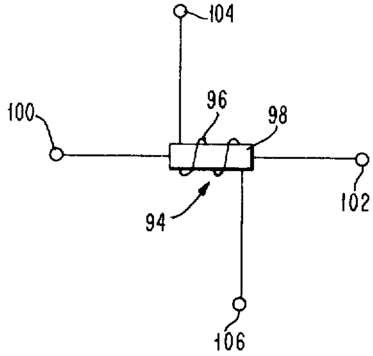
FIG. 3 illustrates, in schematic form, a cryotron, a four terminal device which is useful in the construction of physical embodiments of the present invention.
Figure 7:
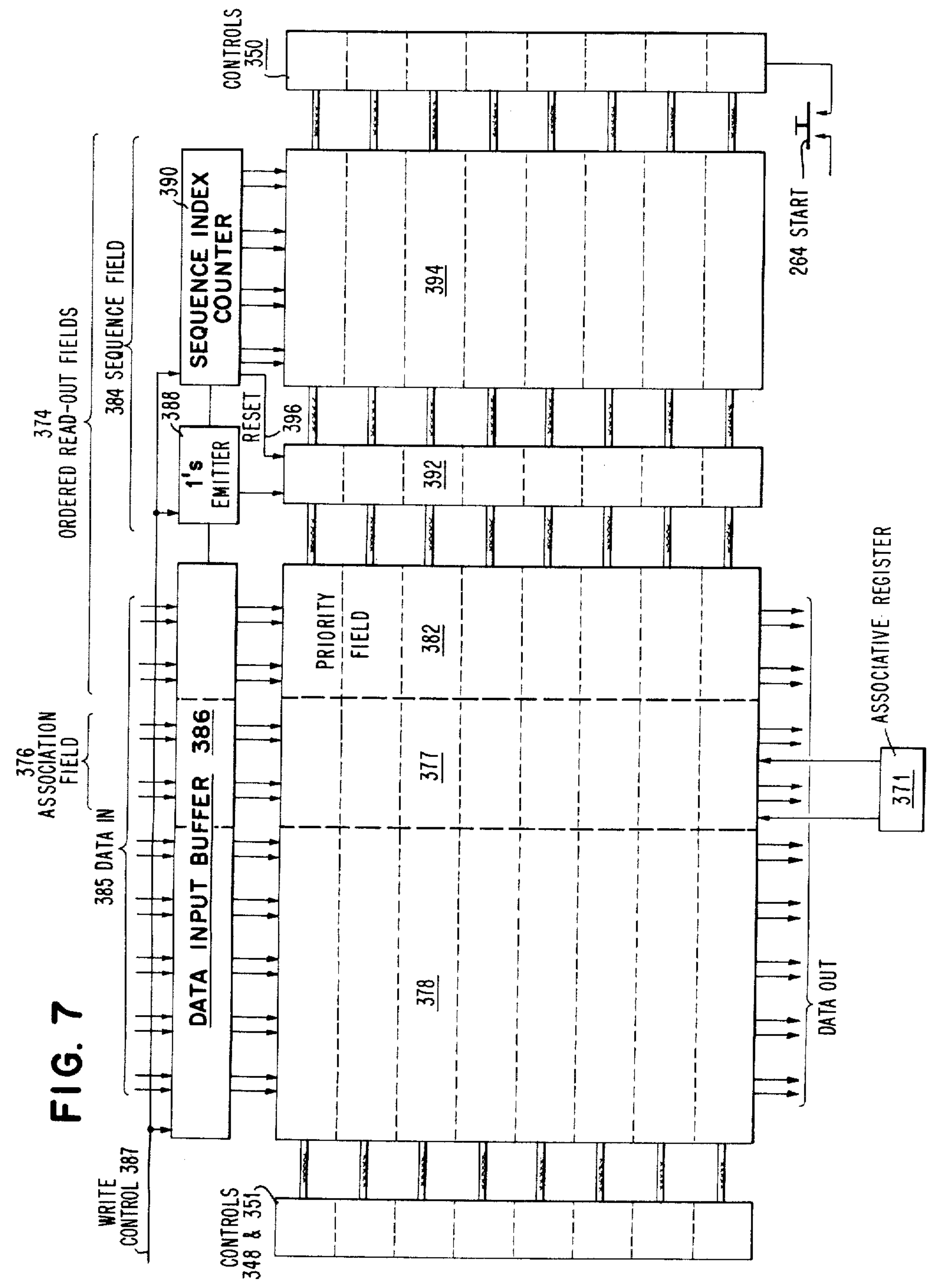

And FIG. 7 is a schematic block diagram representation of a modification of the cryogenic embodiment of FIG. 3 incorporating the associative feature shown in FIG. 6 which is particularly adapted for use as a queuing memory.

Figure 1:
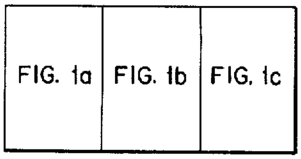
Figure 1A:
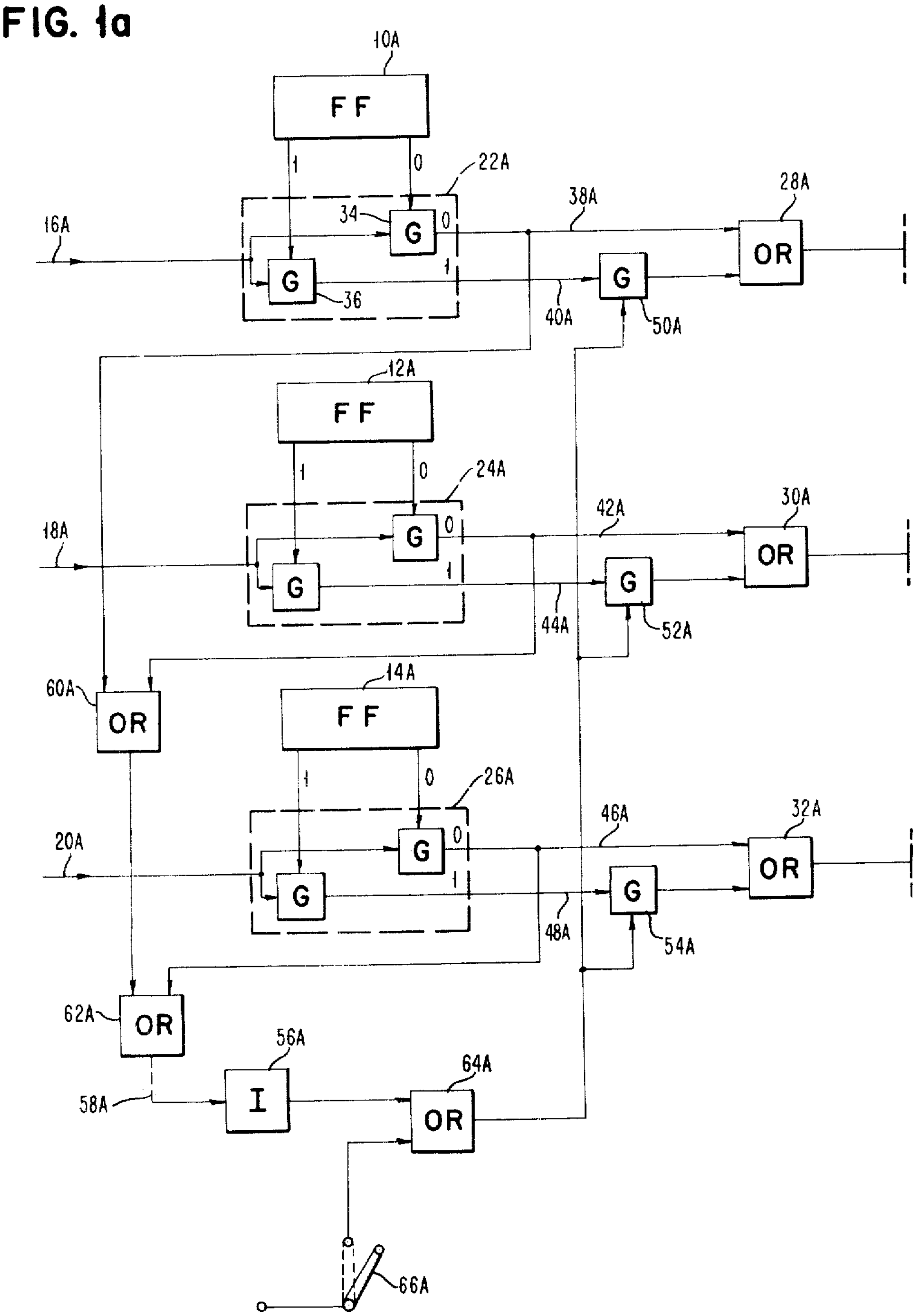
Figure 1B:
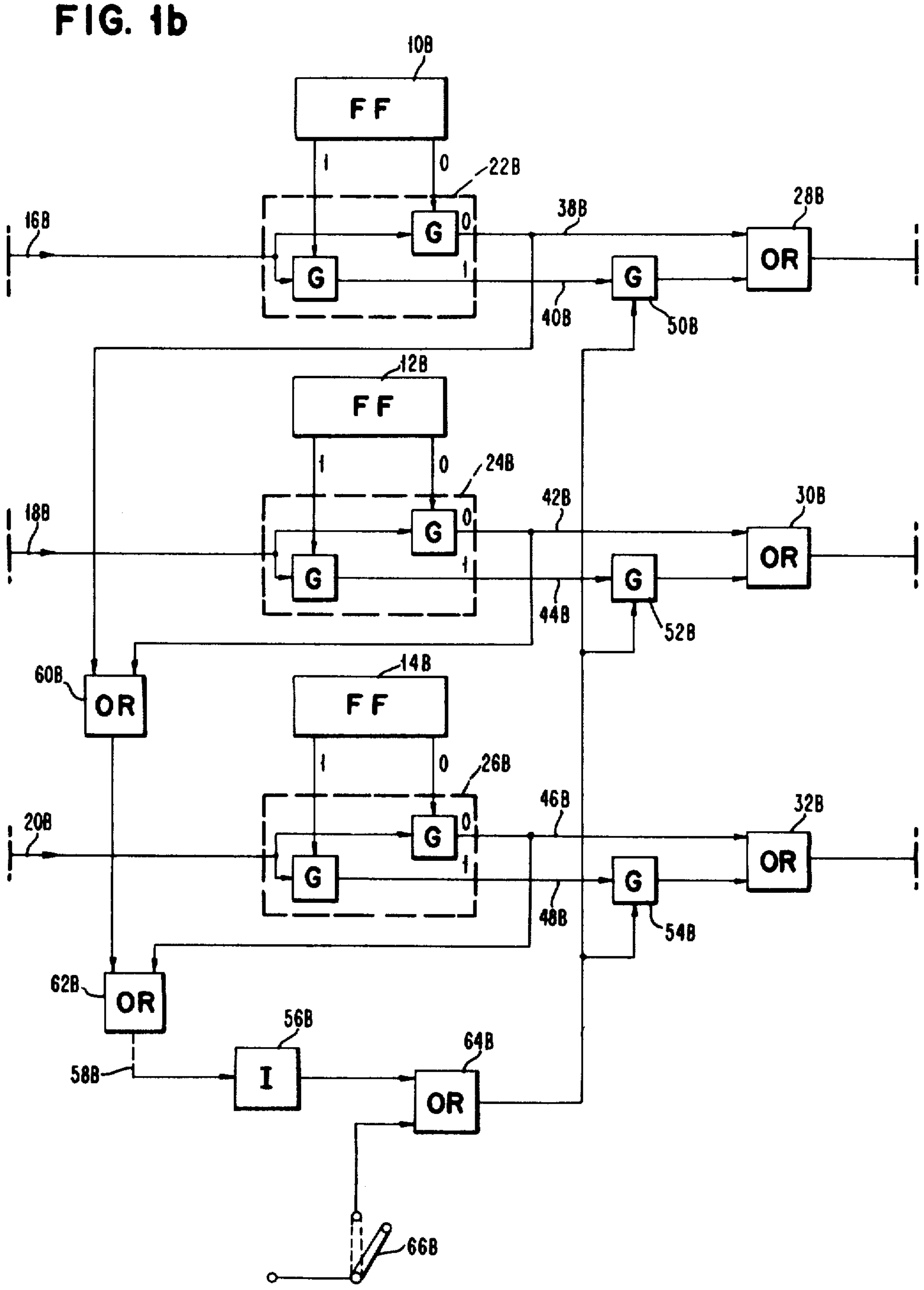
Figure 1C:
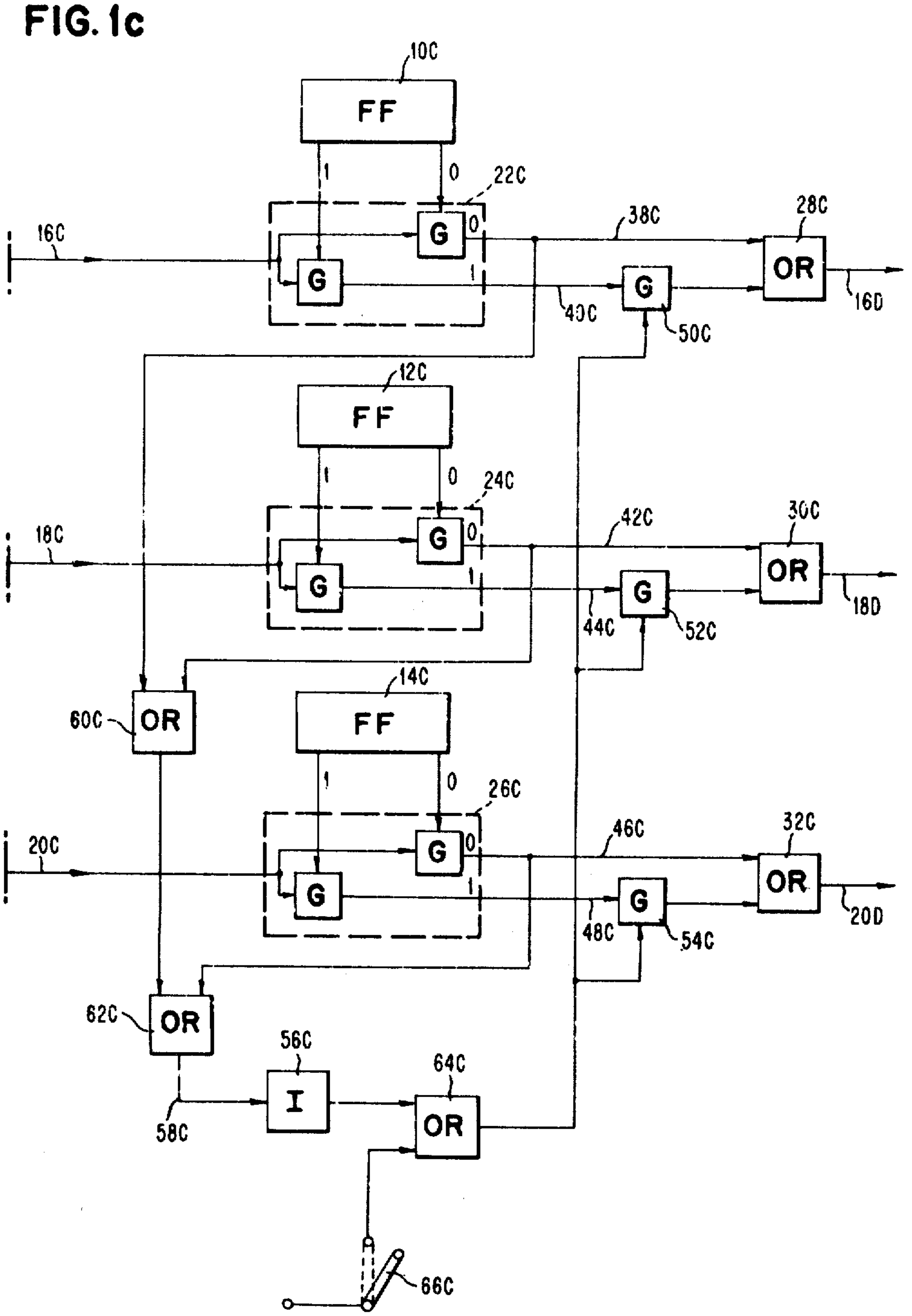

FIG. 1 shows how FIGS. 1*a*, 1*b*, and 1*c* are arranged together to form a schematic logical circuit diagram of a preferred form of the system of this invention. This diagram is referred to below simply as FIG. 1. This FIG. 1 shows a memory system including a first row of flip-flops 10A, 10B, and 10C for storing a first word, a second row of flip-flops 12A, 12B, and 12C for storing a second word, and a third row of flip-flops 14A, 14B, and 14C for storing a third word. The lowest order flip-flops 10C, 12C, and 14C are arranged to form a column. The second order flip-flops having the suffix B, and the third order flip-flops having the suffix A are similarly arranged. For each row of flip-flops, there is an ordering control circuit. These ordering control circuits have inputs indicated at 16A, 18A, and 20A and outputs at 16D, 18D, and 20D. Each ordering control circuit includes a flip-flop condition detection circuit for each flip-flop of the associated word. These condition detection circuits for the first word are identified as 22A, 22B, and 22C. Similarly, the flip-flop condition detection circuits for the second word are identified at 24A, 24B, and 24C and for the third word at 26A, 26B, and 26C. The ordering control circuits are operable in such a way that when input currents are applied at input connections 16A, 18A, and 20A, a corresponding output current appears at output connections 16D, 18D, and 20D only for the word or words having an extreme value. As used in this specification, the term "extreme value" is used in its mathematical sense to identify either the highest value or the lowest value. As shown in FIG. 1, the system is arranged to indicate the lowest extreme value. The flip-flop condition detection circuits may be said to be connected in cascade through OR circuits. At the first word level, these OR circuits are shown at 28A, 28B, and 28C. At the second and third word levels they are indicated at 30A, 30B, and 30C and at 32A, 32B, and 32C.

Each condition detection circuit includes a zero gate and a one gate as respectively indicated in condition detection circuit 22A at 34 and 36. These gates are respectively under the control of the zero and one outputs of the associated flip-flop. Thus, if the binary value stored in flip-flop 10A is zero, gate 34 is opened and the input at 16A causes an output to appear at the zero output of the condition detection circuit 22A indicated at 38A. On the other hand, if the flip-flop 10A is in the binary one condition, the 16A signal passes through the one gate 36 and appears at the one output of the condition detection circuit indicated at 40A. The corresponding condition detection circuit outputs at the second and third word levels are respectively indicated at 42A, 44A, 46A, and 48A. Corresponding condition detection circuit outputs for the other columns are similarly lettered, but with the suffixes B and C. The zero output at connection 38A is connected through the OR circuit 28A to form the input signal at the input connection 16B for the condition detection circuit 22B for the next lower order. This structure is repeated and the output is supplied from the lowest order, where the zero condition detection circuit output 38C is connected through OR circuit 28C to form the ordering control circuit output at 16D. This output appears for the condition where all word digits are zero.

For each condition detection circuit, there is also a further coincidence circuit gate as indicated respectively at 50A, 50B, and 50C and at 52A, 52B, and 52C and at 54A, 54B, and 54C. It is clear that if these gates are not open, only the zero output signal from the associated condition detection circuit is effective to pass a signal through the associated OR circuit such as 28A to the condition detection circuit for the next lower order. However, if the gate such as gate 50A is opened, then the other condition detection circuit output, as from connection 40A is connected through OR circuit 28A as an alternative input to the next lower order condition detection circuit.

The gates 50A, 52A, and 54A are all operated by a special circuit for the associated column which may be identified as an "all ones" circuit, or as an "all second condition" circuit. The "all ones" circuit for this highest order includes an inverter 56A which is controllable through an input connection 58A from a series of OR circuits 60A and 62A. The OR circuits are arranged for energization from any one of the zero outputs of the flip-flop condition detection circuits in the associated column. Thus, OR circuit 60A is arranged to respond to either or both of the zero condition detection circuit outputs 38A and 42A, and the OR circuit 62A is arranged to respond to the zero condition detection circuit output 46A, or to the output of OR circuit 60A. Thus, the inverter 56A is switched in response to the presence of any one or more zero condition detection circuit outputs. However, in the absence of any such zero outputs, the inverter 56A provides an output through the OR circuits 64A to each of the gate circuits 50A, 52A, and 54A. Such a signal obviously is indicative of the condition of "all ones" in all of the active condition detection circuits of the column. If it is desired that no recognition is to be given to differences which exist in the highest order digit of the various numbers then an alternative input is supplied to the OR circuit 64A from a column suppress switch indicated at 66A. Each of the lower order columns also have associated therewith similar "all ones" circuits having components similarly numbered, but with the suffixes B and C respectively.

The logical operation of the system is as follows: The flip-flop condition detection circuits, such as 22A, 24A, and 26A, first provide a comparison between the highest order digits of all of the words in the memory. In any word in which this highest order digit is a zero, the word continues to be a candidate for selection as the lowest valued word in the memory. This is signified by the fact that the zero detection signal which appears on the condition detection circuit output, such as 38A, is continued through OR circuit 28A and provides an input to 16B which is the next lower order condition detection circuit. However, any word which displays a binary one in this highest order digit comparison is discarded as a candidate for the selection as the lowest valued word. This is accomplished, for instance, at the connection 40A where a one signal is stopped at gate 50A and does not continue through the OR circuit 28A. However, under the special condition when all of the active words display a one value in this highest order, it is impossible to eliminate any one word on the basis of the comparison in this column. Because of this, the "all ones" circuit including the inverter 56A is effective to open all of the gates 50A, 52A, and 54A to permit the flip-flop condition detection circuits for the next lower order to be effective in all words. The operation is identical in each of the lower orders, any detected zeros permitting a continuance of the comparison to lower orders, and any ones providing an elimination of the associated word from the selection, with the lowest word or words causing an ultimate selection output current on one or more of the output connections 16D, 18D, and 20D.

It will be appreciated that each of the "all ones" detection circuits is operative in the presence of an "all ones" condition in all of the active condition detection circuits. This may occur in the presence of zeros stored in flip-flops associated with inactive condition detection circuits. For instance, if the third word is eliminated from the selection by the detection of a one in the highest order and stoppage of the ones signal at gate 54A, then the condition of ones in both of the condition detection circuits 22B and 24B in the second order is sufficient to permit the operation of the second order "all ones" detection circuit to open gates 50B and 52B. This is true even if there is a zero stored in flip-flop 14B. Since there is no input current at 20B, there is no condition detection circuit output at the zero output connection 46B which might otherwise be supplied to OR circuit 62B to shut off or disable the inverter 56B and the associated "all ones" detection circuit. This is appropriate because the third word has been eliminated as a candidate for selection as the lowest valued word by the previous detection of a one in the highest order.

It will be understood that the low word detection signals available at output connections 16D, 18D, and 20D may be used for the purpose of simply signaling or indicating which word has the lowest value. Alternatively, such signals may be used for the purpose of switching a read out circuit (not shown) for the purpose of reading the information out of the word position which has been selected as the lowest. The ordering control circuits for the word which has been selected as the lowest may then be disabled and the cycle may be repeated so as to select the lowest valued remaining word, which will be the word having next to the lowest value. This process may be repeated again and again with the result that the words are read out in numerical order sequence.

While the embodiment of FIG. 1 has been shown and described in terms of a sequence beginning with the lowest valued word and continuing to the highest valued word, with only a slight modification, the system may be changed for inverse operation starting with the highest valued word and continuing to the lowest valued word. For this purpose, it is only necessary to reverse the output connections of each flip-flop such as 10A with the associated condition detection circuit gates such as 34 and 36. With such a reversal, for instance, the "zero" output from flip-flop 10A will be connected to gate 36 instead of gate 34, and the "one" output from flip-flop 10A will be connected to gate 34. With these changes in connections, the lowest valued words will be first eliminated in the operation of the condition detection circuits. Also, the circuits previously described as "all ones" detection circuits now operate as "all zeros" detection circuits. It will be apparent that the operation with this reversal of connections is entirely analogous to the operation as described above. Because of this easy reversibility of the systems of the present invention for the selection of either the lowest valued or the highest valued word, generic reference to the operation of the circuit will be made below by the use of the term "extreme value" to signify either the highest value or the lowest value. Furthermore, the output connection 38A from the condition detection circuit 22A will be referred to as an output connection for indicating a "first condition." Also, each of the circuits identified previously as an "all ones" circuit, such as the circuit including inverter 56A, will be generically referred to as an "all second condition" circuit.

While the embodiment of FIG. 1 has been disclosed as having a very limited size, having a capacity for only three words of three digits each, the size of the apparatus may be expanded vertically to provide additional word level rows such that a memory of fifty, or one hundred, or perhaps even thousands of words may be provided. Also, the system may be expanded in width to provide additional digit order columns so that words of many more digits may be accommodated in each row. These expansions simply involve duplications of the apparatus as shown. The principles of operation of the larger memory would be identical to those described in connection with this disclosure of a memory having limited size.

It will frequently occur that in the enlarged embodiments mentioned above, it will be desired to base the selection of individual words upon only a certain selected field, or perhaps several selected fields within the entire word. When this is true, it is apparent that it is necessary only to close the column disablement switches such as switches 66A, 66B, or 66C for the particular columns representing those fields upon which the selection is not to be based.

Figure 2:
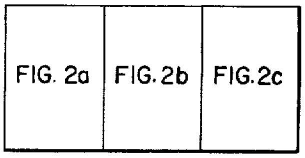
Figure 2A:
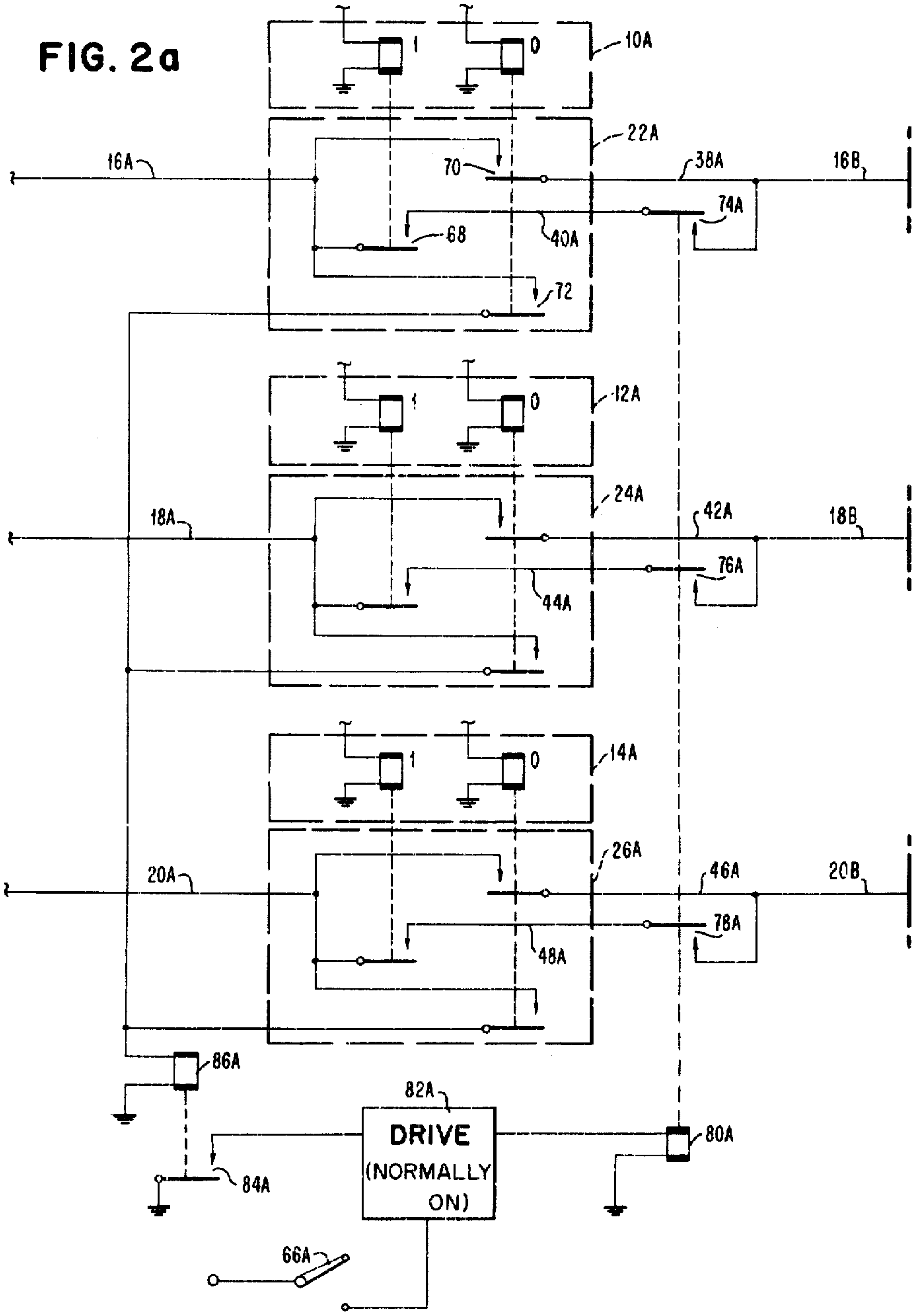
Figure 2B:
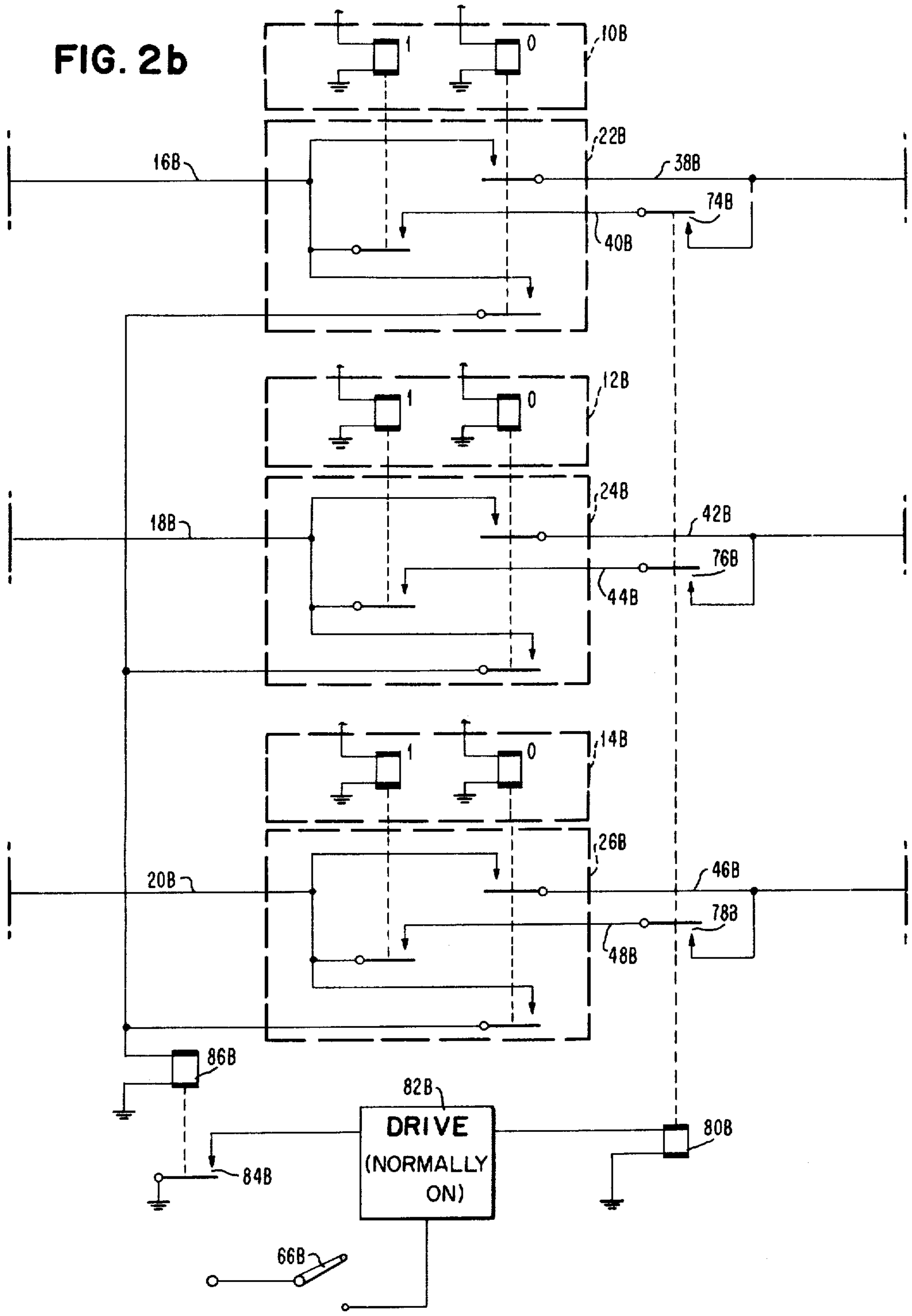
Figure 2C:
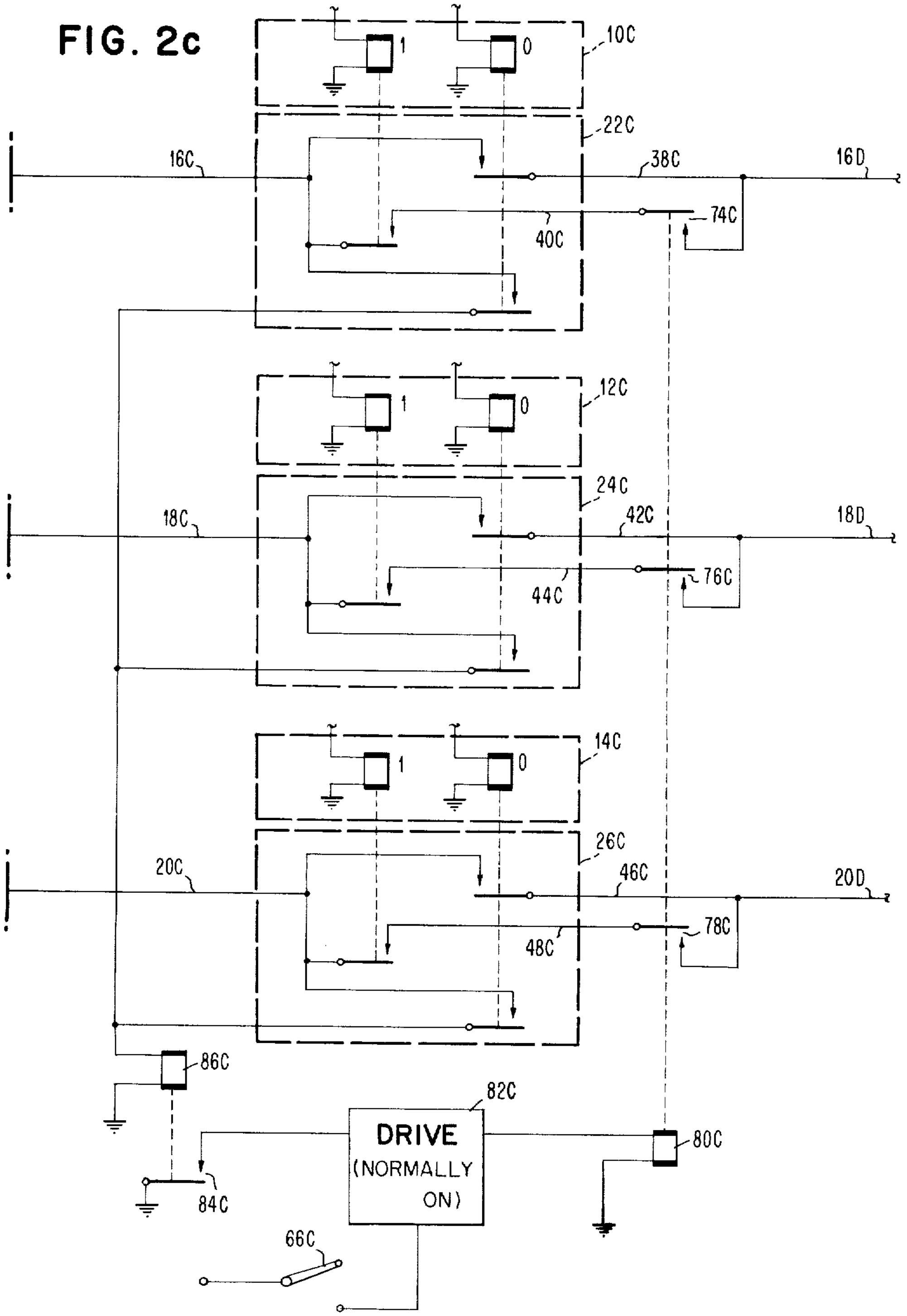
Figure 5A:
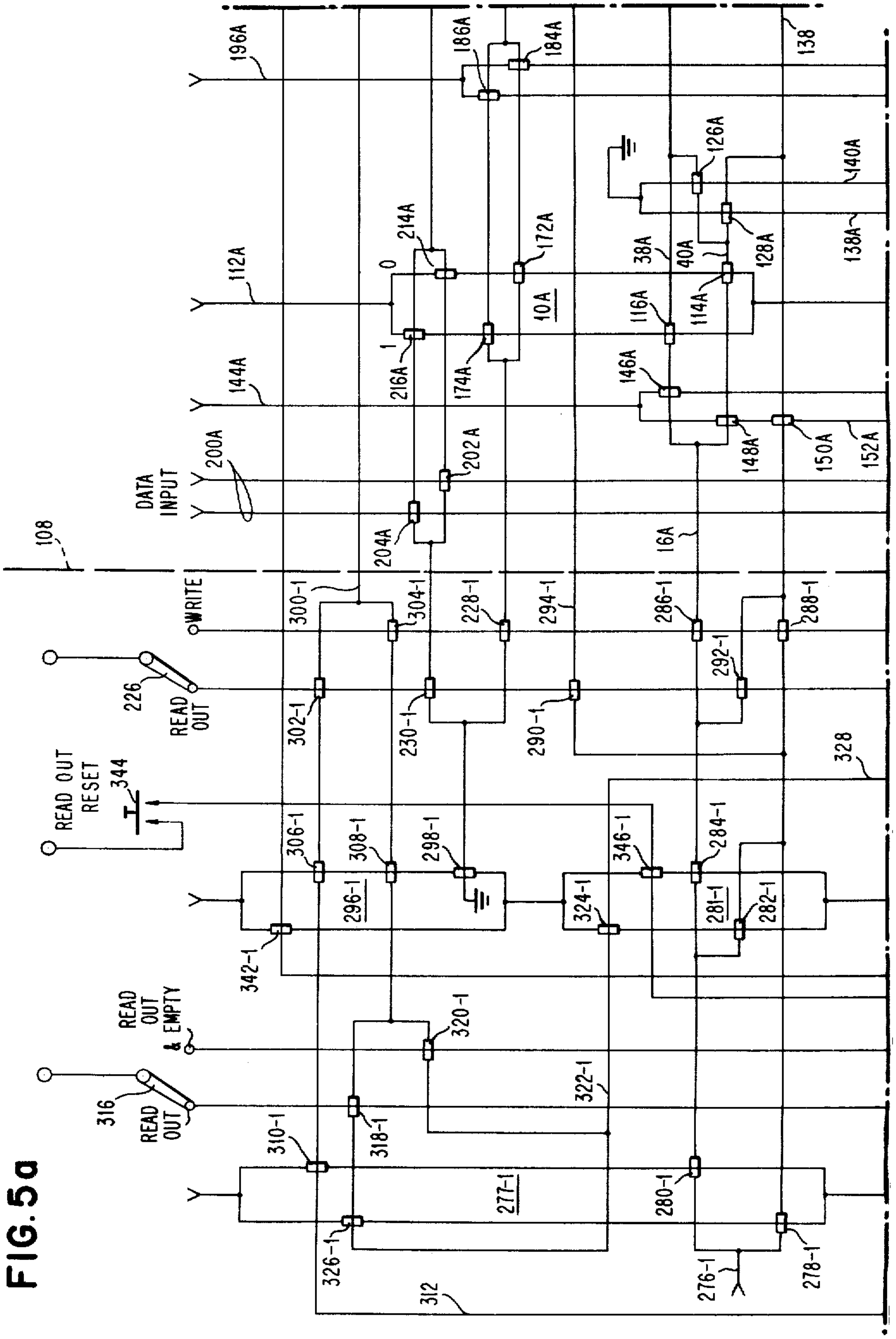
Figure 5B:
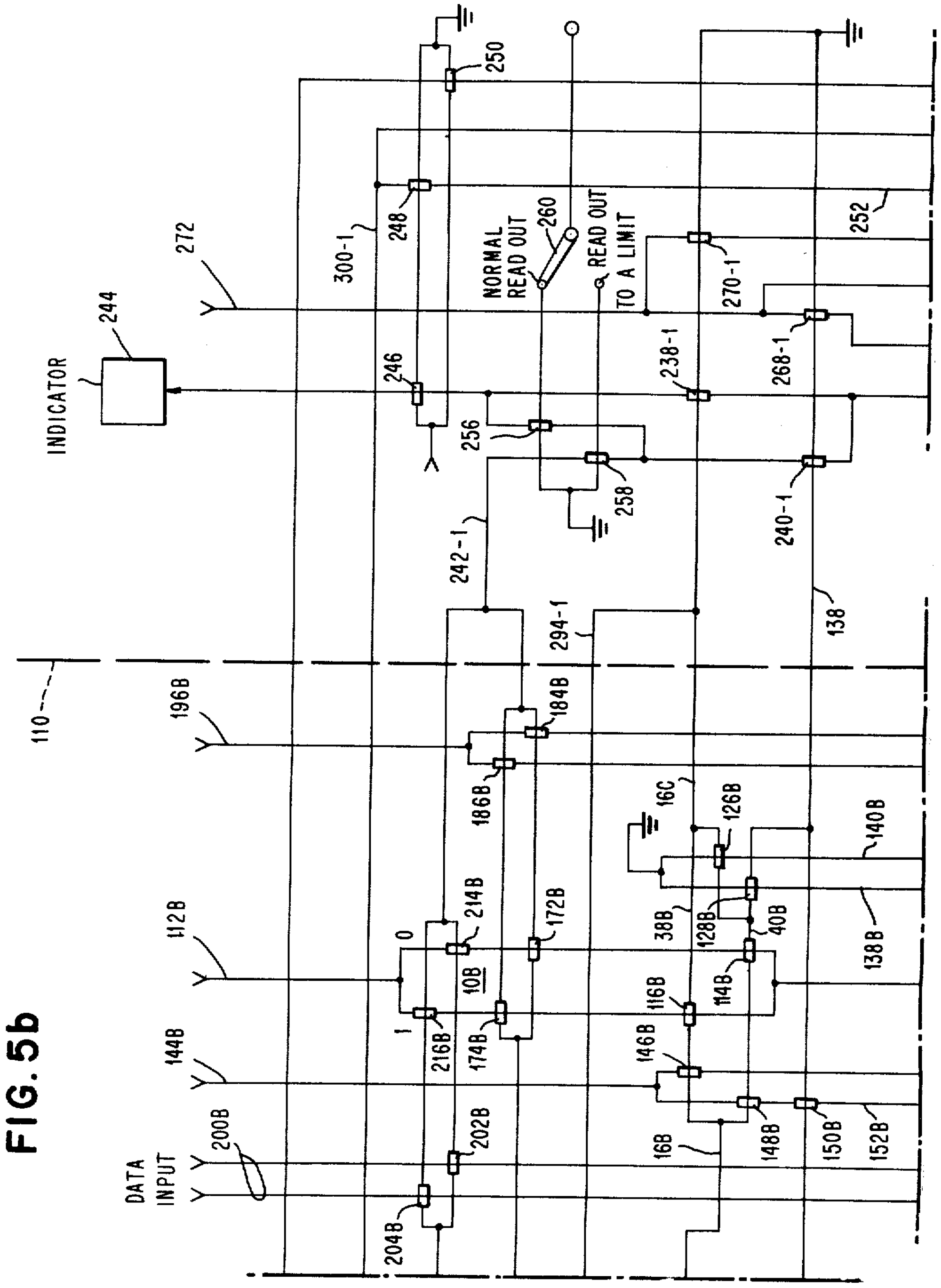
Figure 5C:
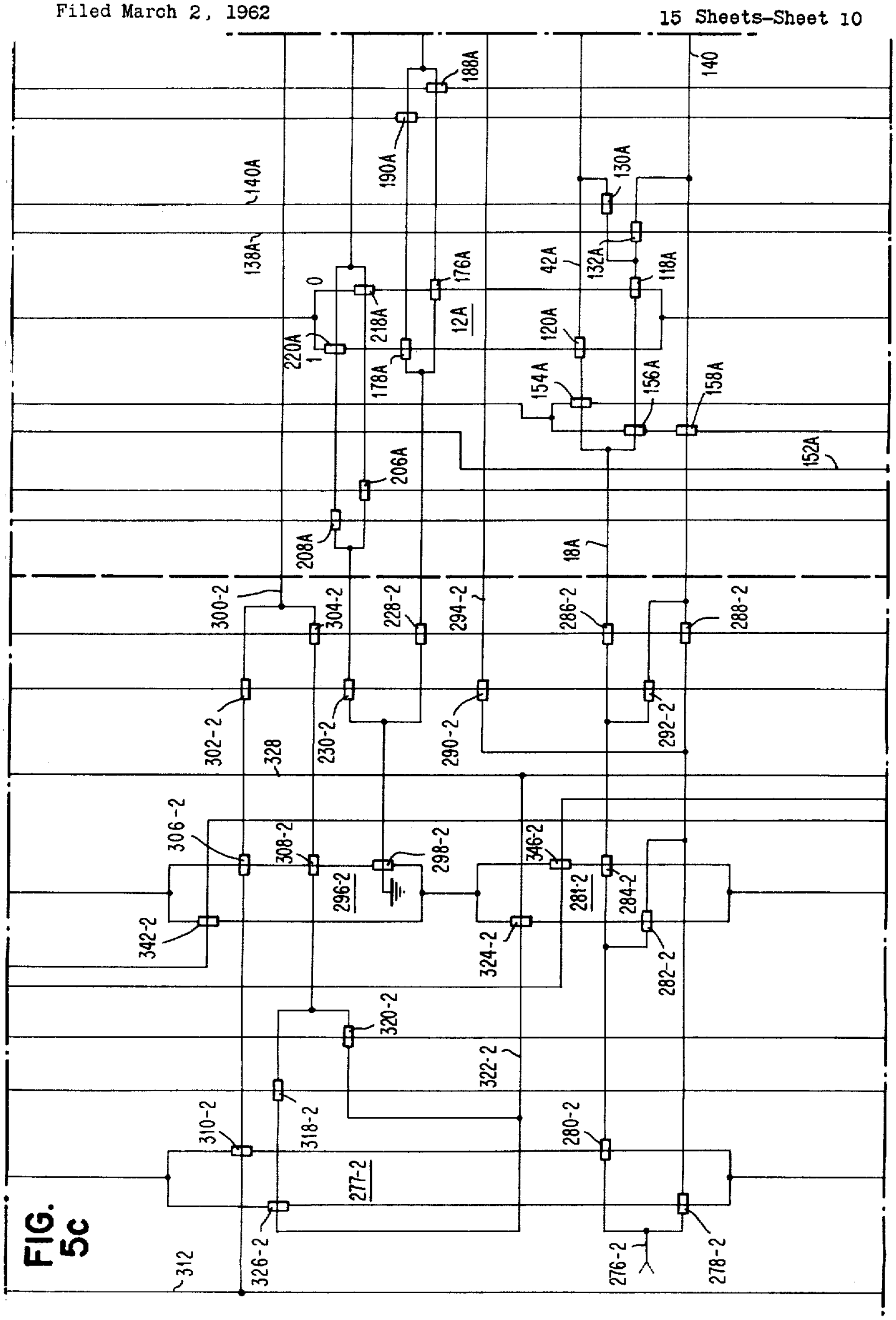
Figure 5D:
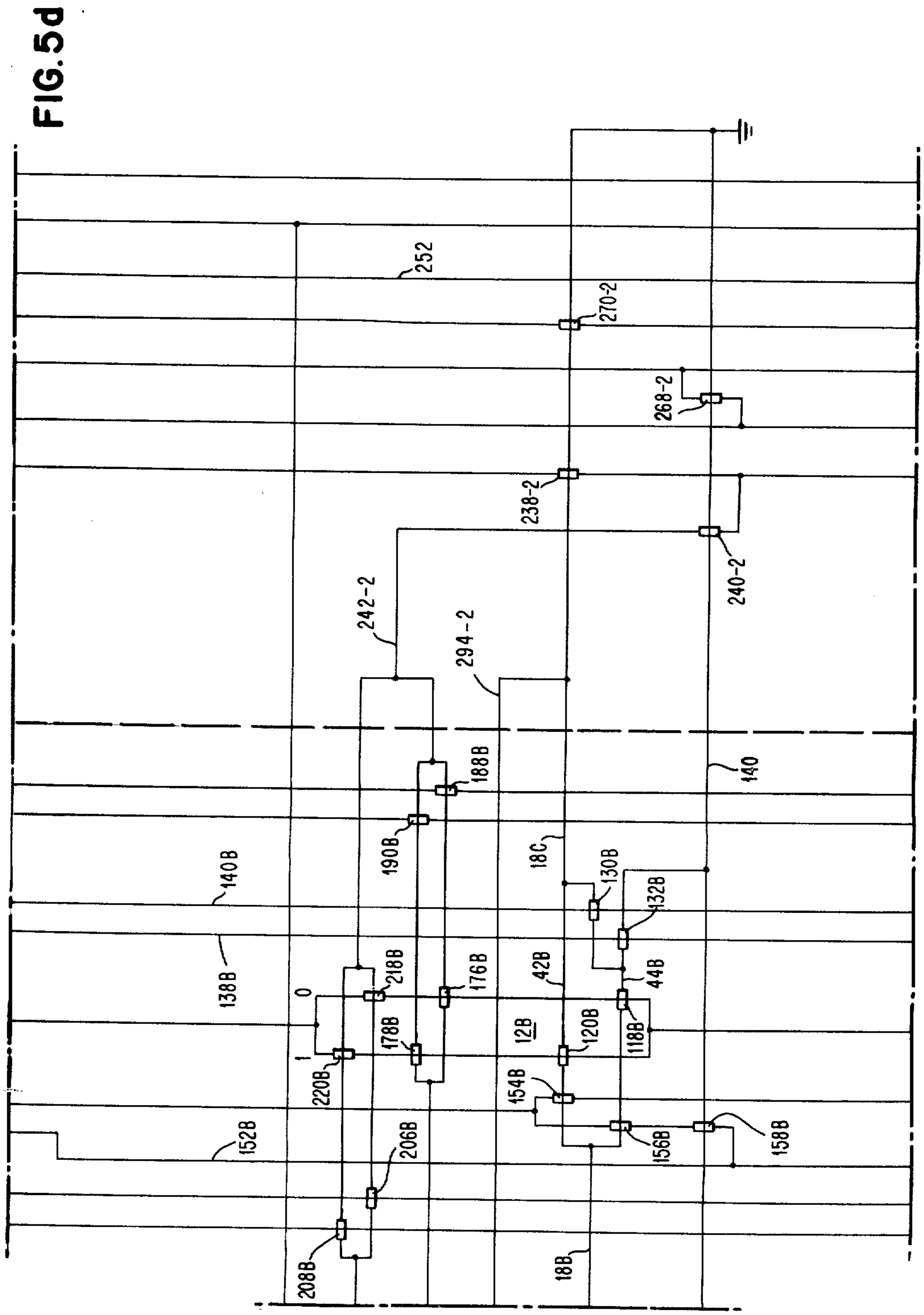
Figure 5E:
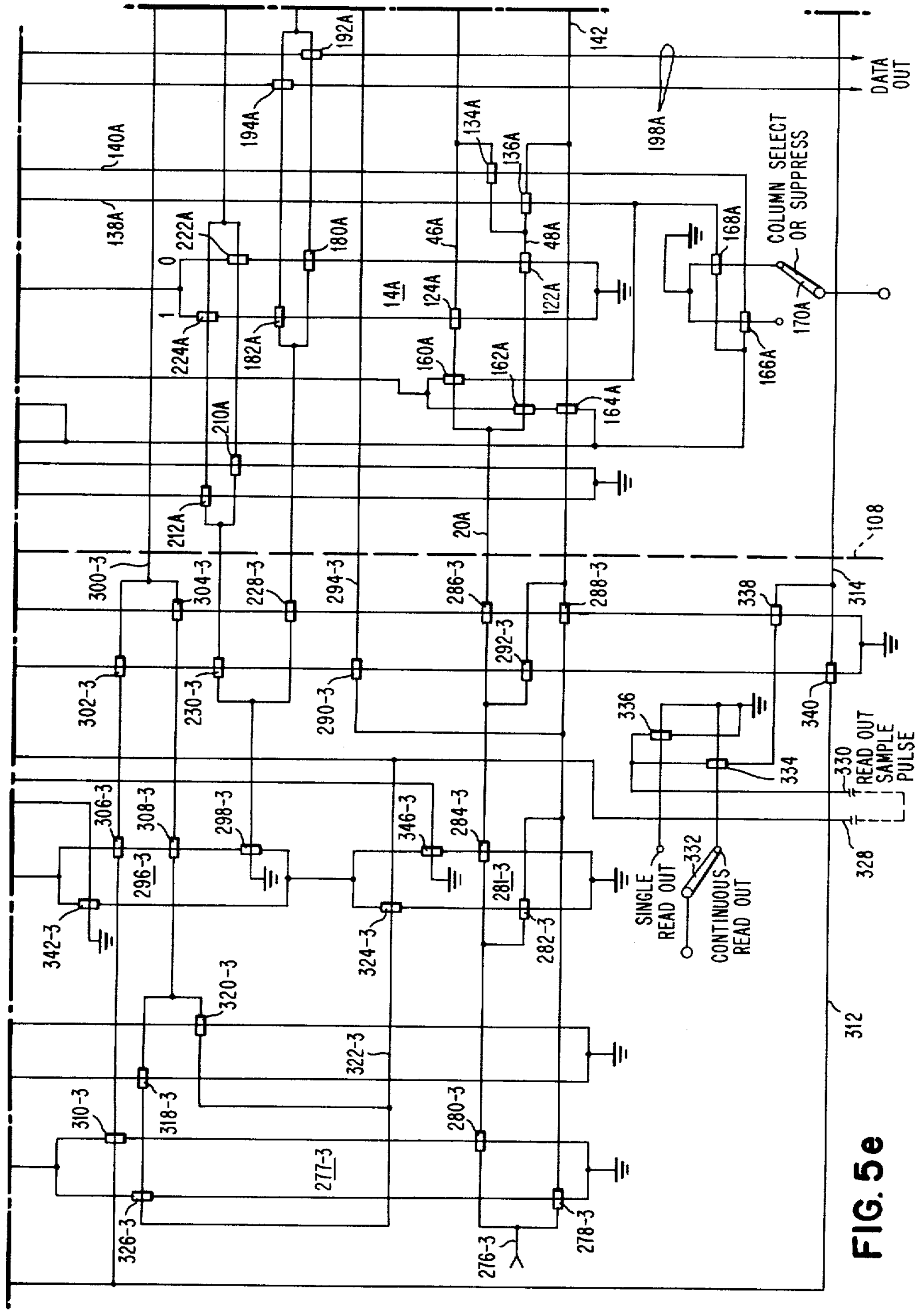
Figure 5F:
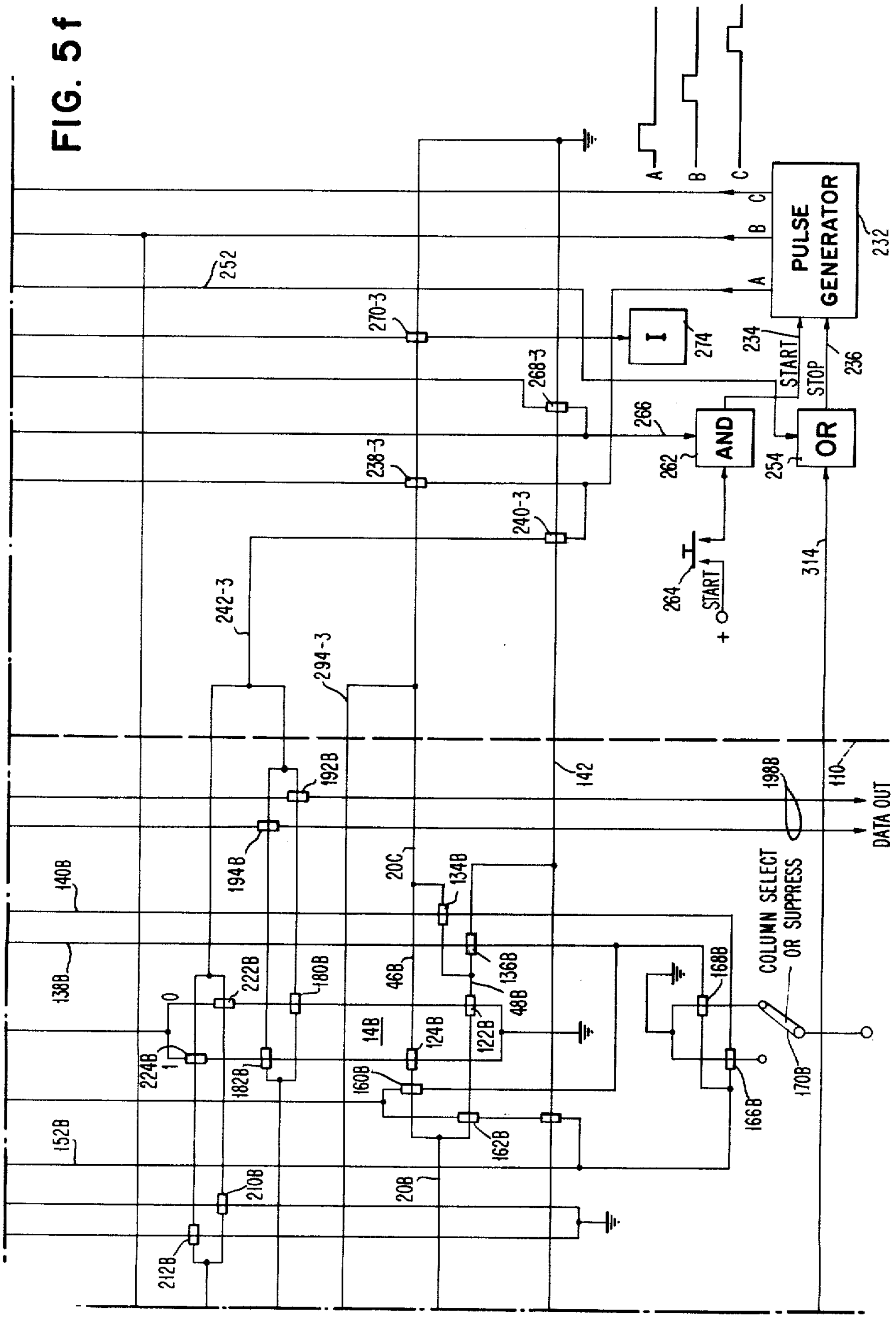

FIG. 2 incorporates FIGS. 2*a*, 2*b*, and 2*c* and shows how FIGS. 2*a*, 2*b*, and 2*c* are arranged together to form a schematic circuit diagram of a simple relay embodiment of the invention. This diagram is referred to below simply as FIG. 2. The FIG. 2 embodiment is very similar to the embodiment of FIG. 1 and the various components and connections are lettered similarly to the corresponding components and connections of FIG. 1 in so far as possible. In FIG. 2 each flip-flop such as 10A is represented by two relay windings which are arranged for alternate energization for the purpose of representing either a zero or a one value. For simplicity the energizing circuits for these windings are not shown. It will be understood that these flip-flops may each include a number of relay contacts associated with each relay which are not shown in this figure. Each of the associated condition detection circuits includes relay contacts which are actuated by the flip-flop relays. Thus, for instance, in condition detection circuit 22A, the function of the one gate 36 of FIG. 1 is performed by a normally open set of relay contacts indicated at 68 which are actuated by the one relay winding of flip-flop 10A. Similarly, the function of the zero gate 34 of FIG. 1 is provided by the normally open pairs of relay contacts indicated at 70 and 72 which are actuated by the zero relay.

The function of the "all ones" circuit gates such as 50A, 52A, and 54A in FIG. 1 is provided by normally open relay contacts 74A, 76A, and 78A which form a part of a normally energized relay having winding 80A. The relay winding 80A is normally energized by a driving amplifier 82A. The driving amplifier 82A is of conventional construction, and may be a simple vacuum tube or transistor amplifier circuit and accordingly the details of this amplifier are not shown. Amplifier 82A is connected and arranged so that it can be turned off by the closure of a normally open pair of relay contacts 84A which form a part of a relay having winding 86A. The winding 86A is connected to all of the zero detection outputs of the condition detection circuits 22A, 24A, and 26A through the zero relay contacts such as 72. Thus, if a zero appears in any of the flip-flops of the first column, the relay winding 86A is energized to turn off the amplifier 82A and to de-energize the relay winding 80A to open the gate contacts 74A, 76A, and 78A. Therefore, it is apparent that the relays indicated by windings 80A and 86A, and the amplifier 82A, and the apparatus associated with these components provides the function of the "all ones" circuit. If the "all ones" condition exists, relay winding 86A will not be energized and the gate contacts 74A, 76A, and 78A will remain closed as required. As in FIG. 1, an additional control for the amplifier 82A is provided as schematically represented by switch 66A to keep the amplifier 82A on even if relay contacts 84A are closed. This has the effect of disabling the order detection circuits because no word can then be eliminated from the ordered selection on the basis of a comparison in this particular digital order. The apparatus for each of the succeeding orders in this embodiment of FIG. 2 is similar to that just described for the first order and correspondingly lettered, but with the suffixes B and C. The operation of the apparatus for the second and third orders is identical to the operation of the first order.

The circuit of FIG. 2 has been designed purposely to employ only normally open relay contacts since such relays are sometimes available in forms which are less expensive than comparable relays also having normally closed contacts or transfer contacts. If normally closed contacts are also employed, various circuit simplifications are possible. For instance, in each of the flip-flops such as 10A, it is only necessary to provide a single relay and the presence of a signal on that relay would indicate one binary condition, and the absence of the signal would indicate the other binary condition. If the zero relay is omitted then the zero condition contacts 70 and 72 would become normally closed contacts on the "one" relay. With such a modification it would be possible also to provide that the "all ones" gate contacts 74A, 76A, and 78A could be simply normally closed contacts actuated by the relay having the winding 86A, and this would eliminate the need for the amplifier 82A and the separate relay having the winding 80A.

The system of FIG. 1 is particularly well adapted for embodiment in cryogenic circuitry employing cryotron switching devices. A detailed schematic circuit diagram of such a system is shown in FIG. 5. However, before proceeding with a more detailed description of the system of FIG. 5, a description of the cryotrons and the cryotron circuit notation employed in FIG. 5 is given below in conjunction with FIGS. 3 and 4.

The term "cryotron" as used in the present specification refers to cryogenic gating devices composed of materials which are said to be normally superconductive when maintained at very low temperatures such as may be achieved by immersion in liquid helium, for example. These cryotron gating devices include a main or gate conductor of superconductive material and a separate control conductor arranged such that when a current is provided in the control conductor, it is effective to produce a magnetic field which causes the gate conductor to lose at least some of its superconductive properties so that the gate conductor becomes resistive.

FIG. 3 illustrates such a cryotron device 94 having a control winding 96 around a gate element 98. The current to be gated or controlled flows through the gate element 98 between terminals 100 and 102, while the control current which causes such gating flows through the winding 96 between terminals 104 and 106.

Figure 4:
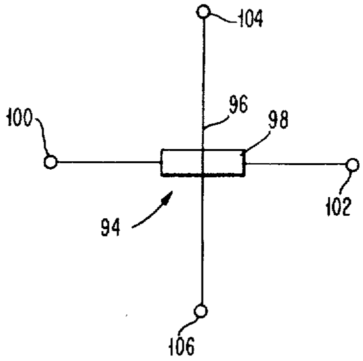
FIG. 4 is a simplified representation of the cryotron of FIG. 3 which is employed in FIGS. 5 and 6 relating to cryogenic embodiments of the present invention.

In FIG. 4, the cryotron of FIG. 3 is illustrated in a simplified form, the same reference numerals being employed to designate corresponding parts. It is to be seen that the only difference is that the winding 96 is represented in FIG. 4 simply by a conductor disposed across gate element 98. This simplified representation of a cryotron is employed in all of the following figures showing cryogenic embodiments of the present invention. In these systems, the circuit lines or wires and the control conductor or winding 96 of each cryotron may be composed of a so-called "hard" superconductor material such as niobium or lead. On the other hand, the gate element 98 of each cryotron may be composed of a "soft" superconductor material such as tantalum or tin, for instance. The current employed is such that the current in the control winding 96 creates a magnetic field which exceeds the critical field value to cause the gate 98 to become resistive, but the field does not exceed such a critical value with respect to the material of the control winding 96 and the interconnecting lines and wires, so that these elements remain substantially superconductive.

When two gate conductors are electrically connected in parallel, one being superconducting and the other being resistive, a current flowing to the parallel combination will flow entirely through the superconducting gate, although the other gate may exhibit only a few tenths of an ohm resistance. Then, if the resistive gate is allowed to become superconducting, the current will continue to flow through the original superconducting gate. Thus, current is caused to flow through a selected path which is maintained superconducting and such current will continue to flow in that path even if other parallel paths later become superconducting.

It is to be understood that the cryotron devices may be constructed of thin films such as are shown and described in co-pending application Serial No. 625,512, filed November 30, 1956 by R. L. Garwin and entitled "Fast Cryotrons" and assigned to the same assignee as the present invention. Additional information on cryogenic superconductive gating devices and certain logical circuits which may be created with such devices is contained in an article by D. A. Buck entitled "The Cryotron—A Superconductive Computer Component" in Proceedings of the IRE, volume 44, No. 4, pages 482–493, April 1956.

FIG. 5 shows how FIGS. 5*a* through 5*f* are to be combined to form a schematic diagram of a cryogenic embodiment of the system of FIG. 1. FIGS. 5*a* through 5*f* will sometimes be referred to collectively below simply as FIG. 5. In the embodiment of FIG. 5, in so far as practical, the parts and components of the system are identified by the same numbers as were used for the corresponding parts of FIG. 1.

The portions of FIG. 5 corresponding to the basic systems as disclosed in FIGS. 1 and 2 appear entirely between the vertical dotted lines 108 and 110 and the initial portions of the description of FIG. 5 will be limited to this central portion of the FIG. 5 diagram. The apparatus of FIG. 5 which is shown to the left of dotted line 108, and that shown to the right of dotted line 110 relate entirely to control functions for detecting and controlling the selection of individual words and for storing the information as to which words have been selected in the past and which word positions are empty, as described more fully below.

In the central portion of FIG. 5 between lines 108 and 110, for simplicity there is shown only the apparatus necessary for the storage of three two-digit words which are arranged in three rows and two columns. As explained in connection with the other figures, the system may be expanded in size by the addition of more rows and more columns to handle more words of larger size. In this FIG. 5 the cryogenic digit storage flip-flops are lettered to correspond to the first two columns of flip-flops of FIG. 1. The individual flip-flops and the associated apparatus will be explained by reference for example to flip-flop 10A which is the high order flip-flop in the first word. As indicated in the drawing, the presence of the cryogenic current in the right leg of flip-flop 10A signifies the storage of a binary zero digit. Alternatively, the presence of current in the left leg of the flip-flop 10A signifies the storage of a binary one digit. A current may be continuously supplied to the flip-flop 10A through the connection indicated at 112A from a conventional current source (not shown). The zero branch or leg of flip-flop 10A includes the control winding of a cryotron 114A and the one leg includes the control winding of a cryotron 116A. These two last mentioned cryotrons perform the gating functions associated with gates 34 and 36 in FIG. 1. They are operable to gate the current in the condition detection circuit from the input connection 16A to either the zero detection output 38A, or the one detection output 40A. Similar condition detection gate cryotrons are shown for flip-flop 12A at 118A and 120A, and for flip-flop 14A at 122A and 124A.

The current at 16A must pass through either the gate of cryotron 114A or the gate of cryotron 116A. If flip-flop 10A stores a zero, signified by a current in the zero line including the winding of cryotron 114A, then the current from 16A is caused to traverse the gate of 116A to the zero condition detection circuit output 38A. Conversely, the storage of a one in flip-flop 10A is signified by a current in the control winding of cryotron 116A, and then the 16A current is forced to travel through the gate of cryotron 114A to the one condition detection circuit output 40A. It is apparent from the drawing that the current in the zero output 38A continues on to provide the current at connection 16B which is the input connection for the condition detection circuit for the next lower order digit of the same word.

The function of the all ones gate shown in FIG. 1 at 50A is provided in FIG. 5 by the cryotrons 126A and 128A and the circuitry associated therewith. Corresponding all ones gate functions are provided at the second and third word levels by cryotrons 130A, 132A, and 134A, and 136A. If the all ones condition exists in the first column, then a current is provided on line 138A which traverses the control winding of cryotron 128A. This causes any ones detection current appearing at condition detection circuit output 40A to be transferred through the gate of cryotron 126A to join the output connection 38A and to provide an input to 16B. On the other hand, if the all ones condition is not detected, then a current is provided on line 140A which traverses the control winding of cryotron 126A so that the 40A current must traverse the gate of cryotron 128A. This signifies the elimination of the word from the selection since no current is thus supplied to condition detection circuit input 16B. The current traversing the gate of cryotron 128A is supplied instead to a word rejection current line 138. Similar word rejection current lines are provided at the second and third word levels at 140 and 142. The current in the word rejection current line 138 is used in opposition to the condition detection circuit current such as that in line 16B, and in opposition to the word selection outputs, such as may appear at connection 16C, for various switching functions as will be described in more detail below.

The all ones detection circuit includes an input connection indicated at 144A which is supplied with a current from a conventional current source (not shown). This current traverses either the gate of cryotron 146A or the gate of cryotron 148A and the gate of cryotron 150A. Since the control winding of the cryotron 146A forms part of the zero detection branch 38A of the condition detection circuit, whenever a zero is detected in flip-flop 10A by this 38A circuit, the 146A cryotron is resistive, forcing the current from 144A through the gates of cryotron 148A and 150A to the line 152A. A current in the 152A line thus signifies the presence of a zero. Similar circuitry is provided at each word level in each column. At the second word level the cryotrons are identified as 154A, 156A, and 158A, and at the third word level they are identified as 160A, 162A, and 164A. It is apparent that a shift to the left of the current originating at 144A into line 152A at any of the three word levels through the operation of cryotrons 146A, 154A, and 160A will signify the existence of at least one zero in the column so that the all ones condition is not fulfilled. The line 152A extends through the gate of a cryotron 166A to become the control line 140A which controls the all ones gate cryotrons 126A, 130A, and 134A as described above. This assumes that the cryotron 168A shown at the bottom of the diagram is resistive. If the ordering control circuitry and the all ones detection circuit for the first column is to be effective, the cryotron 168A must be resistive. This is accomplished by a select suppress control function provided by apparatus schematically illustrated by switch 170A through which a current is supplied to the control winding of cryotron 168A. If the ordering control circuitry is to be suppressed for this first column, then the column suppress control switch 170A is shifted to the left to make cryotron 166A resistive and to permit cryotron 168A to become conductive, thus diverting the current from line 152A to the line 138A to close the gates of the all ones circuit cryotrons 128A, 132A, and 136A. As explained above, when this line 138A is energized, the condition detection circuits will not distinguish between zeros and ones, since the ones detection currents, such as the current in line 40A are cross connected such as through the cryotron gate 126A to continue the word selection current to input 16B.

Returning again the description of the operation of cryotrons 146A, 148A, and 150A, it is apparent that if a binary one exists in flip-flop 10A, then the resultant condition detection circuit current in branch 40A, which includes the control winding of cryotron 148A, will cause the current from source 144A to traverse the gate of cryotron 146A. If a one is likewise stored in each of the other levels, the current continues down the right branch circuits through the gates of cryotrons 154A and 160A to provide the control current on connection line 138A to signify the all ones condition. However, as mentioned above, if a zero is stored at any one of the three word levels, the current will be diverted to the left into line 152A since the all ones condition does not exist.

If any word is to be omitted from the group from which a selection is to be made, a current will exist on the word rejection current line 138, for instance, at the control winding of cryotron 150B. If the first word has been already eliminated from the selection by the diversion of the word selection current through the gate of cryotron 128A, then the current will exist at the second digit of the first word at the control winding of cryotron 150B. This condition would occur in the presence of the storage of a one in flip-flop 10A in conjunction with a storage of a zero in any one or more of the flip-flops 12A and 14A.

From the above, it is clear that in the all ones detection circuitry including the cryotrons 146A, 148A, and 150A, a prior rejection of the word as signified by a current in the control winding of cryotron such as 150A accomplishes the same control function as the indication of a one signified by a current in the control winding of cryotron 148A. This is proper because the all ones detection circuit must be sensitive to the existence of the all ones condition whenever it exists in all of the words which remain in the class from which the selection is to be made. Stated another way, the existence of a zero in a particular word at a particular digit order is significant only if the associated word could be selected as the word having the lowest value based upon the comparison of the present order column and the higher order columns. It is believed to be clear from the above explanations that the logical functioning of the condition detection circuits of FIG. 5, including cryotrons such as 114A and 116A, and the all ones detection and gating circuits such as those including cryotrons 146A, 148A, and 150A and 126A and 128A are quite analogous to the operations described above in connection with FIG. 1.

After the selection of a particular word for read out, the actual transfer of information from the individual digit flip-flops of that word is accomplished by a read out information transfer circuit. At the flip-flop 10A, for instance, this read out information transfer circuit includes the gates of cryotrons 172A and 174A which have control windings respectively connected in series in the zero and one branch circuits of the flip-flop 10A. Counterparts of these read out information transfer cryotrons are found at the second and third word levels at 176A, 178A, 180A and 182A. The information to be read out is transferred by means of the circuit including the cryotrons 172A and 174A to a read out bus having alternate circuit cryotrons 184A and 186A connected to gate the read out bus current by means of control currents derived from the read out information transfer circuit. Again, similar read out bus cryotrons are shown for the second and third word levels at 188A, 190A, 192A, and 194A. The read out bus may be supplied continuously with a current through connection 196A from a conventional current source (not shown). When information is to be read out, the read out information transfer circuit including the gates of cryotrons 172A and 174A is supplied with a pulse of current which transfers the information from flip-flop 10A to the read out bus including the cryotrons 184A and 186A. The current in the read out bus remains switched to correspond to the information stored in flip-flop 10A even after the read out information transfer circuit is de-energized. This is true because of the inherent storage characteristic of cryotron circuits. The data to be read out thus appears as a signal current on either one of the two lines of the read out bus as indicated at 198A. The operation of the circuits is the same at each word level and at each digit position of each word. The controls which provide the proper read out information transfer circuit current pulse at the proper word level and at the proper time are described in detail below in connection with the description of the control section of the system of FIG. 5.

Data is entered into the individual flip-flops such as 10A by means of an alterate current input bus indicated at 200A. Information is transferred from the input bus 200A at the flip-flop 10A by means of a write information transfer circuit including cryotrons 202A and 204A having control windings in the input bus lines and having gate circuits forming a part of the write information transfer circuits. Similar circuits associated with input bus 200A are shown at each of the other word levels in conjunction with cryotrons 206A, 208A, 210A, and 212A. The write information transfer circuit is effective to transfer the information from the bus to the flip-flop 10A by the control of cryotrons 214A and 216A having gate circuits connected respectively in series in the zero and one branches of the flip-flop 10A. Similar flip-flop cryotrons are shown for flip-flop 12A at 218A and 220A and for flip-flop 14A at 222A and 224A. The information current in the data input bus 200A may be continuous, except when new information is supplied and the current is shifted from one branch to the other. The flip-flop current for flip-flop 10A, 12A, and 14A is also supplied continuously. The information is transferred through the write information transfer circuit by means of a current pulse supplied to this circuit by the control system which will be described more fully below. It is clear that the circuit just described is intended to provide for the writing in of only one word at a time. Similarly, the read out circuitry is intended to provide for the reading out of only one word at a time. However, there may be a continuous succession of such readout operations.

While much of the preceding description of FIG. 5 has referred specifically to the circuit components associated with flip-flop 10A. It is apparent that the cryotron components and circuitry associated with each of the other flip-flops 12A, 14A, 10B, 12B and 14B are substantially identical in construction and operation. Also, the components associated with the B column flip-flops 10B, 12B, and 14B are lettered similarly to the corresponding components in the A column except for the substitution of a B suffix.

While the system of FIG. 5 is basically a unitary system, as explained above it is described here in sections for the purpose of clarity. Immediately above, there was described the central portion of the system as shown in the diagram between vertical dotted lines 108 and 110. The control portions in this system are shown at the left and right ends of the diagram, to the left of line 108 and to the right of line 110. There is no particular functional significance to the physical separation of the left control section and the right control section since apparatus in each of these control sections cooperates with all of the other apparatus, and with the apparatus previously described in the central section of the system to provide the desired over all system operation.

As indicated above, the system of FIG. 5 may be operated either to write a new word in the memory, or to read out words from memory in an ordered sequence. For the purpose of determining whether the system shall be operative for write or read, switching circuits are necessary as illustrated schematically near the upper left portion of the diagram by a single pole double throw switch at 226 and the cryogenic switching circuits associated therewith. For instance, these write-read control circuits respectfully contain the control windings of cryotrons 228–1 and 230–1 having gate circuits connected in series in the write and read information transfer circuits at the first word level. Similar cryotrons are to be found at the second and third word levels at 228–2, 230–2 and 228–3 and 230–3. Since the two information transfer circuits at each word level are supplied from a common current source, the cryotrons such as 228–1 and 230–1 determine which information transfer circuit is to be effective. If the switch 226 is in the read out energizing position, then cryotron 230–1 is resistive and the information transfer circuit current is caused to traverse the gate of cryotron 228–1 and the read out information transfer circuit as required. This same control function is effective at each word level. Other control functions provided by the write and read out control circuitry associated with switch 226 will be described below.

The control circuits of FIG. 5 operate from pulses supplied from a pulse generator 232 shown in the bottom right corner of the figure. Since this pulse generator 232 may be of conventional construction, for simplicity and clarity, the details of construction are not shown here. However, the pulse generator 232 is of a type which will start when it receives a signal at a start input line 234 and which then emits a series of three pulses in sequence at the three output lines identified as A, B, and C and which continues to emit successive series of A, B, and C pulses on those output lines until a stop signal is received upon the stop signal input line 236. In each case, the current series of A, B, C pulses is completed after the stop signal is received. That is, if the stop signal is received at the "B" pulse time, then the pulse generator continues by emitting a final C pulse before it stops.

In the explanation which was given above for the operation of the central section of the system of FIG. 5, it was explained that if a word is selected as having the lowest value, the result is a selection circuit output current which will appear at 16C for the first word, at 18C for the second word, or at 20C for the third word. If the corresponding words are rejected, the current is directed instead to the lines 138, 140 or 142 respectively for each of the three words. The control circuits contain cryotrons shown at 238–1, 238–2, and 238–3 for detecting the selection of each of the three words of the memory in terms of a current on each of the respective word selection lines. Corresponding cryotrons are shown at 240–1, 240–2, and 240–3 for detecting the rejection of each of these three words. The circuits including the various 238 and 240 cryotrons are connected to the A pulse output line of the pulse generator 232. When the system is being operated, the A pulse current travels upwardly in these circuits to the level of the lowest positioned word which has been selected. If the third word has been rejected, the cryotron 240–3 will be resistive and the current will continue upwardly through the gate of cryotron 238–3. Similarly, if the second word has been rejected, cryotron 240–2 will be resistive, and the current will continue upwardly through cryotron 238–2. If the third word is selected, then the cryotron 238–3 will be resistive and the A pulse current will traverse the gate of 240–3 into connection 242–3. However, if the third word is rejected and the second word is selected, then the current will traverse the gate of cryotron 238–3 and the gate of cryotron 240–2 to the connection 242–2. It will be apparent that if the third word is selected, and if the second word also is selected, the A pulse current will be supplied to connection 242–3 since it will not be able to traverse the cryotron 238–3 so as to reach the second word level. The connections 242–1, 242–2, and 242–3 are the individual common current supply connections for the information transfer circuits for either write or read out.

As explained above, if the read out operation is to be performed, then on the third word level, the read out control cryotron 230–3 will be resistive which will cause the A pulse current at connection 242–3 to traverse the read out information transfer circuit including the gate of control cryotron 228–3 and the associated information transfer circuits such as those including the control windings of cryotrons 192B and 194B. However, if the system is in the write mode of operation as signified by the write setting of control switch 226, then the cryotron 228–3 will be resistive and the information transfer current will traverse the gate of control cryotron 230–3 and the associated information transfer circuits such as those including the control windings of cryotrons 222B and 224B. The "A" pulse circuitry described in the paragraph immediately above is similar in many respects to read out control circuitry which forms a part of the subject matter described and claimed in a copending patent application, Serial No. 120,213 filed on June 28, 1961 by Robert I. Roth and Harold Fleisher entitled "Associative Memory System" and assigned to the same assignee as the present application.

If all three words are rejected, the A pulse current continues on through the gate of cryotron 238–1 to energize an indicator 244. The indicator 244 will thus indicate that all words were rejected which means that the read out operation is completed, or if the system is being operated in the write mode, it will indicate that there are no empty word positions. This meaning for the operation of indicator 244 when the system is operated in the write mode will be better understood from the further explanations which follow below. The indicator 244 may include latching apparatus to maintain the indicator in the "on" condition after the A pulse stops, but such latching apparatus is not shown. The indicator energizing circuit through the gate of cryotron 238–1 also includes the control winding of a cryotron 246 which forms a part of a control flip flop. This flip flop includes the control winding of a cryotron 248 in the same leg and the gate of a cryotron 250 in the opposite leg. The gate of the cryotron 248 provides a circuit which carries the current from the B pulse output of the pulse generator 232 through a connection 252 which goes downwardly in the diagram to an OR circuit 254 which is connected to energize the stop signal input 236 to the pulse generator 232. Thus, whenever this control flip flop including cryotron 246 is set by the indicator current, the cryotron 248 becomes conductive and the B pulse is supplied through the cryotron 248 to the OR circuit 254 to cause the pulse generator 232 to stop after the next succeeding C pulse. The passage of the B pulse current through the gate of cryotron 248 assumes the condition that all of the other possible paths for the B pulse are resistive. As will appear from the following description, this condition will exist whenever all of the words are rejected and the indicator current switches the cryotron 246. The control winding of cryotron 250 is included in the C pulse output circuit of the pulse generator 232 so that this control flip flop is immediately reset by the C pulse following the A pulse which caused it to be set through the control of cryotron 246. It is quite clear that when the read out is completed, as detected by the operation of the indicator 244, it is appropriate that the pulse generator 232 should be stopped by the B pulse supplied through cryotron 248 as just described.

In the operation of the A pulse circuitry including cryotrons such as 238–1 and 240–1, it was assumed that a cryotron shown at the first word level at 256 was resistive, and an associated cryotron 258 was conductive. This may be regarded as a normal mode of operation of the system in which read out of the entire contents of the memory are required and in which the first word level is to be written into in a normal manner and employed for word storage in the same manner as the other word positions. However, an important feature of the present invention, as exemplified by the embodiment of FIG. 5, resides in the ability of the system for an ordered read out of a sequence of words up to a previously specified limiting value in the ordering field. When this mode of operation is desired, the limiting value is stored in the first word position, and by means of control circuitry schematically illustrated by the double throw switch 260, the control current is shifted from the winding of cryotron 256 to the winding of cryotron 258. With this change in connections, it is apparent that whenever the condition is achieved that the lowest valued word in the memory is that word which is stored in the first word position, then the A pulse current which traverses the gate of cryotron 240–1 is diverted through the gate of cryotron 256 to the indicator 244 to indicate an end of the read out operation and to cause the pulse generator 232 to be stopped as previously described.

If the limit operation is not required, then the switch 260 is kept in the upper position to maintain cryotron 256 resistive.

As indicated previously in connection with the other embodiments of this invention, by a few simple changes in connections, the ordered read out circuitry may be arranged to commence the ordered read out with the highest valued word (rather than the lowest valued word) and to proceed to read out successively lower valued words until the entire memory has been read out. In such a modification, the limit circuitry associated with switch 260 is effective again to stop the successive read out operations when a particular limit value is reached. The limit value is then a low limit.

For the limit operation, special writing control circuits must be provided (not shown) to be certain that the limit value word is specifically written into the first word position. In all other writing operations (such as described below), there is no need for writing any particular word in any particular position within the memory. The only requirement is the selection of an empty word position.

The pulse generator 232 may be initially started by energization of the start input connection 234. This is carried out through an AND circuit 262 which operates in response to a coincidence of signals from a schematically illustrated start switch 264 and an input connection 266. The circuitry associated with connection 266 is provided merely for the purpose of indicating that the selection and rejection circuits are operative and that at least one word has been selected. The circuits associated with connection 266 may include the parallel connected cryotrons 268–1, 268–2 and 268–3, and the series connected cryotrons 270–1, 270–2, and 270–3. A current may be supplied continuously from a standard current source (not shown) through the input connection indicated at 272. If all words are rejected, then all of the parallel connected cryotrons 268–1, 268–2, and 268–3, will be resistive and there will be no input to the AND circuit 262 at 266. The current from 272 will instead traverse the cryotrons 270–1, 270–2, and 270–3 to energize an indicator 274. Indicator 274 will remain energized through the 270 cryotrons as long as all words remain rejected. However, whenever any one word is selected, the selection current at that level will make the 270 cryotron at that level resistive and the associated 268 cryotron at that level will become conductive so as to provide for a path for the current from 272, to the AND circuit 262. It is clear therefore that whenever any one or more words are selected, there will be an output 266 to the AND circuit 262.

Referring now to the control section of the system of FIG. 5 shown at the left of the figure, it is shown that the word selection and rejection circuits are provided with a continuous current through input connections 276–1, 276–2, and 276–3. These currents each may be provided from a conventional current source (not shown).

At the extreme left of the diagram there is a flip flop for each word level for the purpose of indicating whether or not that word level is empty or full. These flip flops are designated 277–1, 277–2, and 277–3. At the first word level, for instance, this flip flop includes the control windings of cryotrons 278–1 and 280–1. If the word position is regarded as empty, there will be a current in the control winding of cryotron 280–1 to appropriately cause the 276–1 current to traverse the gate of cryotron 278–1 which constitutes the word rejection circuit line. This is generally appropriate for the read out operation of the system since a word obviously should not be read out from an empty word position. It will be appreciated that although a word may be considered as empty, the digit storage flip flops such as 10A and 10B need not be reset to their binary zero conditions as long as this "word empty" flip flop is set to the empty state. Immediately to the right of each of the word empty flip flops, another flip flop is shown at each word level which is for the purpose of indicating whether the word has previously been read out (even though it is not considered empty). These flip flops are designated 281–1, 281–2, and 281–3. At the first word level, for instance, this flip flop includes the control windings of cryotrons 282–1 and 284–1. After any word has been read out, this "read out flip flop" is set to so indicate. And the setting of this flip flop causes the current to traverse the control winding of cryotron 284–1 so that the current from 276–1 traverses the gate of cryotron 282–1 to cause the word to be suppressed in future word selection cycles. This is accomplished by the shift of current from the upper word selection line to the lower word rejection line through the cryotron 282–1. If the word has not yet been read out, then the read out flip flop current will traverse the control winding of cryotron 282–1 so that the word selection current will remain in the select line through the gate of cryotron 284–1.

As previously mentioned above, the write and read out control lines energized through schematic switch 226 perform important control functions in addition to the control of the information transfer circuits. For instance, when the system is operated in the write mode, the word selection and rejection circuits must be reversed. This reversal is accomplished through the control of cryotrons such as 286–1 and 288–1 at the first word level. These cryotrons operate respectfully in opposition to cryotrons 290–1 and 292–1. Thus, when the write line from switch 226 is energized, cryotrons 286–1 and 288–1 become resistive and the word selection current from the gate of cryotron 284–1 then crosses over to the word rejection line 138 through the gate of cryotron 292–1. Similarly, if the current is already in the word rejection line from the gate of cryotron 278–1, it is blocked at cryotron 288–1 and traverses the gate of cryotron 290–1 through a line 294–1 to the word selection circuit output connection 16C. On the other hand, if the read out operation is called for by switch 226, cryotrons 290–1 and 292–1 are resistive and the word selection and rejection currents continue in the horizontal circuits through the gates of cryotrons 286–1 and 288–1.

Whenever a write operation is to be performed, all of the "read out flip flops" are reset so that the cross over cryotrons such as 282–1 are resistive and the cryotrons such as 284–1 are conductive. The presence of a current on the word rejection line through the gate of a cryotron such as 278–1 therefore indicates an empty word position and the transfer of this current through the gate of a cryotron such as 290–1 to the word selection output line 16C is appropriate in order that the word may be selected as an empty word position which is properly written into. On the other hand, if the word position is full, as signified by a current through the gate of cryotron 280–1, then the word must be rejected in the write operation and this is accomplished by the transfer of this current through the gate of cryotron 292–1 to the word rejection line. Similar flip flops and cryotron circuits are provided at each of the other word levels.

At each word level there is also provided a control flip flop as indicated at 296–1, 296–2, and 296–3. The purpose of this control flip flop is to detect and store the information that the particular associated word level is the one level which is operative during a particular cycle, and this stored information is employed for the purpose of changing the settings of the word empty flip flops and the read out flip flops as will be described below. The operation of these flip flops and the associated apparatus will be explained with particular reference to the first word level. The flip-flop 296–1 includes the gate of the cryotron 298–1 in the right leg which has a control winding connected for energization from the information transfer circuits. The information transfer circuits through cryotrons 228–1 and 230–1 are joined to provide this control function. Accordingly, if the first word level is the selected word level, the "A" pulse current which traverses the information transfer circuit for that word will set the control flip flop through the cryotron 298–1.

The "B" pulse circuit from the pulse generator 232 includes a horizontal pulse supply line at each word level such as 300–1 at the first word level which branches to traverse the gate of a cryotron 302–1 if the circuit is in the write mode, or to traverse the gate of cryotron 304–1 if the circuit is in the read out mode. At the 296–1 flip flop, both of these branch circuits are opened at the gates of cryotrons 306–1 and 308–1 if the flip flop has been set by the operation of cryotron 298–1. Conversely, if this particular word level has not been selected, the "B" pulse circuit is blocked in both branches by the cryotrons 306–1 and 308–1. The "B" pulse circuits therefore continue to the left only at the one word level which is selected. Also, as previously mentioned, if no word is selected, then all of these 300 circuits are blocked and the B pulse current through cryotron 248 is used to shut off the pluse generator 232.

If the system is operating in the write mode and the first word level is selected, the resultant current through the gate of cryotron 306–1 traverses the control winding of a cryotron 310–1 in the empty word flip flop to set that flip flop to indicate that the word position is filled. The "B" pulse current then continues to a common connection 312 which ultimately leads back at connection 314 to the OR circuit 254 to stop the pulse generator 232.

For the read out mode of operation, the word level may be emptied as well as suppressed, or it may simply be suppressed by setting the read out flip flop. These two methods of operation may be chosen by control circuits schematically illustrated by the double throw switch 316. If the word is simply to be read out and suppressed, then the switch is placed in the left hand position as shown to energize cryotrons 318–1, 318–2, and 318–3. The "B" pulse current through the gate of cryotron 308–1 then traverses the gate of an associated cryotron 320–1 at the first word level to a connection 322–1. From the connection 322–1 the current traverses the control winding of a cryotron 324–1 in the read out flip-flop to set that flip-flop to thereafter suppress the word.

On the other hand, if the circuit is operated for read out and empty, then, at the first word level, cryotron 320–1 is resistive and the "B" pulse current traverses the gate of cryotron 318–1 through a circuit including the control winding of a cryotron 326–1 to reset the word empty flip-flop to the empty condition. This control winding circuit then joins the connection 322–1 to also operate the read out flip-flop through cryotron 324–1 as described just above. The control winding circuits of the cryotrons 324–1, 324–2, 324–3 join in a common circuit 328 which provides a read out sample pulse output. This sample pulse may be supplied to the apparatus which receives the data read out of the system on read out busses 198A and 198B for the purpose of indicating to that apparatus at what time the data should be recognized. Since the data is transferred from the data storage flip-flops to the read out busses at the "A" pulse time, the "B" pulse time is an appropriate time for the new data to be sampled or looked at by the receiving apparatus. The sample pulse output circuit is a closed loop in which the current returns on line 330 from which it is switched to ground or to the stop signal line 314.

The system is capable of operating to read out only a single word or for reading out a continuous sequence of words as determined by switching circuits schematically shown by the double pole switch 332. If a continuous read out operation is required, the switch is operated in the position shown so that a cryotron 334 is resistive and the sample pulse return circuit 330 is grounded through a conductive cryotron 336. However, if a single read out operation is desired, then switch 332 is reversed and the sample pulse return current traverses the gate of cryotron 334 to supply a stop pulse on line 314. Auxiliary cryotrons 338 and 340 are provided in the supply circuits to the stop circuit 314 and under the control of the write and read out circuits from switch 226 as a safety interlock. Cryotron 338 will be conductive during the read out operation when such conductivity is required, and conversely cryotron 340 will be conductive as required during write operations.

In each cycle of operation of the system, immediately after the "B" pulse, a "C" pulse is supplied by the "C" pulse circuit of the pulse generator 232. The function provided by this circuit is to reset the control flip flops 296–1, 296–2 and 296–3 by traversing the control windings of the associated cryotrons 342–1, 342–2, and 342–3.

The read out flip flops all may be simultaneously reset by reset circuitry schematically illustrated by a switch 344 through the energization of each of the control windings of reset cryotrons 346–1, 346–2, and 346–3.

While not shown, similar reset circuitry may be provided to set all of the word empty flip flops to the empty condition if it is desired to empty the entire memory.

As mentioned above, all of the read out flip flops 281–1, 281–2, and 281–3 are reset such as by the operation of switch 344 whenever a write operation is to take place. It is one of the interesting features of the invention also that the contents of the memory may be read out in ordered sequence again and again by simply operating the reset control 344 before each read out sequence is to be commenced.

A number of separate continuous current input circuits have been identified in the system of FIG. 5. It will be understood that because of the nature of cryogenic circuits, a number of these continuous current circuits may be advantageously combined in series connected groups and supplied by a single current source for each group.

FIG. 6 is an abbreviated schematic diagram showing how an associative selection field may be added to the system of FIG. 5 for the purpose of accomplishing a selection of words to be read out on the basis of a combination of an association and the numerical value of a portion of the word. The association is accomplished with respect to a particular field of the word and the ordered selection is accomplished with respect to another definite field.

In the system of FIG. 6, the boxes 348 and 350 which are labeled "controls" are intended to correspond respectfully to the control circuitry of FIG. 5 shown to the left of the vertical line 108 and to the right of vertical line 110 in that figure. The start signal input is schematically illustrated by the push button 264. For simplicity, only the storage flip-flop 12A is shown in FIG. 6 with pertinent portions of the associated circuitry. The associative field which may comprise one or more columns in the memory is added to the left of the ordering field between the ordering field and the controls 348. In conjunction with the controls 348 there must be added association controls 351 including an association field cross over cryotron circuit. This includes a cryotron 352 which interconnects the word selection and the word rejection lines at a point between the controls 348 and the association field. The association field is represented in FIG. 6 by a single flip-flop 354 including write in cryotrons 356 and 358 and read out cryotrons 360 and 362 and association cryotrons 364 and 366. The association circuit also includes cryotrons 368 and 370 having control windings in the two alternate current circuits of an association bus. The association bus information is obtained from an associative register 371 containing individual two state circuits as schematically illustrated by the two pole switch 372.

In operation, the cross over cryotron 352 is "reset" or made resistive by a current on its control winding at the "B" pulse time so that if a current exists on the word selection line indicated at 373, it must continue in this line to the association circuit including the cryotrons 368 and 370. The association field flip-flop 354 is continuously energized so that one of the cryotrons 364 and 366 is always resistive. At the "C" pulse time, one or the other of the association bus circuits is energized to accomplish the association or matching function. If the association information from the association bus corresponds with that stored in flip flop 354, then corresponding cryotrons in the association loop will be resistive and the opposite cryotrons will be conductive and the word selection current will continue through the association circuit to the connection 18A. That is, for instance, if a zero is stored in flip flop 354 and a zero condition exists on the association bus at "C" pulse time, then cryotrons 366 and 370 will both be resistive and 364 and 368 will be conductive. If both are ones, the condition will be reversed. However, if there is a mismatch, one of the cryotrons in each of these serial circuits will be resistive. For instance, cryotrons 366 and 368 may both be resistive. This will cause the current from 373 to be blocked at the association circuit and will force that current through the open gate of cryotron 352 to the word rejection line 140. Because of the inherent character of cryogenic circuits, when the B pulse sets the cryotron 352 to a resistive condition, the current will remain in the 373 word selection circuit until and unless a resistive path is created for this current.

It must be emphasized that only one set of association controls 351 including cross over cryotron circuit 352 is required at each word level for the entire associative field, although the associated field may include many binary digit positions which simply represent a duplication of the flip flop 354 and its associated apparatus. If the data stored in the associative field, including flip flop 354 has passed the association test at the "C" pulse time, then the word selection current will be delivered at connection 18A and the word can be selected by the operation of the ordered read out circuitry as previously described in connection with FIG. 5 and earlier figures. On the other hand, if the association test is not passed, the current is transferred to the word rejection line 140 and the word appears to the ordered read out circuitry as though it had been suppressed such as by the operation of the empty flip flop or the "read out flip flop" of the controls 348.

The association circuitry described in connection with flip flop 354 is similar to that which forms a part of the subject matter disclosed and claimed in copending patent application Serial No. 119,719 filed by Harold Fleisher and Robert I. Roth on June 26, 1961 entitled "Associative Memory" and assigned to the same assignee as the present application.

When the memory system of FIG. 6 is to be operated in the write mode, the control winding of cross over cryotron 352 is continuously energized and the association bus is not energized. When this embodiment of the system is operated in read out mode, a "B" pulse is first applied, a "C" pulse is next applied, and then the read out operation sequence as described in connection with FIG. 5 is commenced with a regular series of ABC pulses. The information contained in the associative register 371 may be changed between "C" pulses if necessary to establish new associative tests for word selection.

FIG. 7 is a schematic block diagram representation of a larger system incorporating the teachings of FIG. 6. In the system of FIG. 7, the words are selected to be read out on the basis of information stored in ordered read out fields and also on the basis of associative information stored in an association field. These fields are indicated generally at the top of the diagram at 374 and 376 respectively. The information for the ordered read out fields is stored in the sections of the memory indicated generally at 382, 392, and 394. The information for the association field 376 is stored in the section of the memory indicated at 377. In addition to the ordered read out fields and the association field, certain additional data storage digit positions are shown for the storage of data which is not to be used in the word selection read out operation. But such data is important for storage and for transmission in the read out operation. This data is stored in the first five digit positions of each word in the system of FIG. 7 as shown at 378. The system controls 348 and 350 are indicated in FIG. 7 by schematic boxes as in FIG. 6. As in FIGS. 5 and 6, the start signal input is schematically indicated by a start push button 264. Incorporated with the controls 348 are the association controls 351 including a cross over cryotron for each word level as described in connection with FIG. 6.

In the system of FIG. 7, words may be selected for read out on the basis of a combination of an associative selection and an ordering selection. The associative selection takes place in the association field 376 on the basis of associative information which is available from the associative register 371. The ordering selection operation is based upon information stored in the ordered read out fields 374. These include a priority field stored in memory section 382 and a sequence field indicated at 384. The association field 376 stored in memory section 377, and the priority field stored in memory section 382 comprise fields of the data words upon which the selection of the words is based. The data words are entered into the memory through input lines indicated at 385 through a data input buffer register 386. The word previously stored in the data input buffer 386 is gated into the memory by changing the signals on the data input busses to correspond to the contents of the data input buffer 386 at any time prior to the initiation of a write operation. This is accomplished by applying a pulse to the buffer write control gate circuit indicated at 387. The write control circuit 387 also applies a signal pulse to a ones emitter 388, and a sequence index counter 390. These devices store numbers in the 384 sequence field portion of the memory. On the basis of these numerical values stored in the sequence field with each data word, it is possible to select words for read out on the basis of the sequence in which the words were written as well as on the basis of the contents of the association field, and the ordering contents of the priority field 382 on the basis of the sequence in which particular words were written into the memory. This sequence control may be either on a direct sequence or on a reverse sequence basis. That is, words may be chosen for read out on the basis of first in first out, or on the basis of last in, first out.

In operation, the ones emitter 388 simply stores a one in the single digit field 392 at each word level at the time a new word is stored at that level. The sequence index counter 390 is a conventional binary counter device which causes the storage of the binary count which it contains in the association field 394 at each word level at the time when a new word is written into that word level. Immediately after every such write operation, and before the next succeeding write operation, the counter is advanced by one. When the counter 390 is filled with one bits, the next normal advance of the counter turns it over to all zeros as though a carry could be taken to a next higher order. However, the signal which would otherwise be a higher order carry is taken from the sequence index counter at output connection 396 and is supplied to the ones emitter field 392 to reset to zero every flip-flop in every word level in that field which stores a one. This means that the first digit of the sequence field is zero for any words which were stored prior to the reset of field 392. These words will be referred to below as first generation words. However, for any words stored subsequent to the reset of field 392, this high order of the sequence field will contain a one. Thus, it will be appreciated that where words are selected for read out on the basis of the lowest value, the new (second) generation of words stored after the operation of the reset circuit will appear to have a higher value than the old generation of words, stored prior to the operation of the reset, even though the sequence index counter has been reset to the all zeros condition from which it recommences its count. Since the data input buffer 386, the ones emitter 388, and the sequence index counter 390 may be of simple conventional construction, they are not shown in detail.

As described above, the sequence index counter 390 and associated apparatus is intended for operation to provide the first in first out result. If it should be desired to reverse the sequence to provide for last in first out operation, the sequence index counter is designed and arranged to count down instead of counting up, and the ones emitter 388 is changed to a zeros emitter, and the contents of the field 392 is set to all ones instead of being reset to all zeros by the connection 396. Another method of obtaining the last in first out result is to modify the ordered read out switching circuits, as previously suggested with respect to the other embodiments of the invention, to read out from the highest to the lowest valued words. This will also involve a change in the assignment of priority numbers stored in priority field 382 so that the highest priority has the highest valued priority number. When read out selection is on the basis of the lowest valued word, the highest priority has the lowest priority number.

The system of FIG. 7 is useful for many purposes in computer systems. For one such purpose, it may be described as a queuing memory. When used for this purpose, the words may be recalled from storage on the basis of a combination of an association, a priority test, and a sequence test relating to the order in which the words were stored in the memory as described above. Referring to FIG. 7, the words are first subjected to an association test based on the information in memory section 377, a priority test based on the information in field 382, and a sequence test based on the contents of the sequence field 384. If the sequence field 384 is operated on the basis of first-in first-out as first described above, then the oldest word in memory which meets the association and priority field tests will be the word selected to be read out. It is quite apparent that no word will be selected for read out unless it meets the association test by matching the contents of the association register 371.

As far as the operation of the circuit is concerned, all of the ordered read out fields 374, including the priority field 382, the ones emitter field 392, and the sequence index field 394 are operated together to provide an ordered readout in accordance with the teachings of the system of FIG. 5. Since the priority field appears in the highest order columns of this combination of ordered read out fields, the priority field clearly takes precedence over the lower digital order columns of the ordered read out fields which contain the sequence information. Thus it is clear that in each read out selection operation, the word chosen for read out must be chosen from that class of words which has the highest priority (signified by the lowest priority number) of all of the words stored in the memory. The class is also restricted, of course, to those words which satisfy the test of the association field 376. Then within that class which satisfies the association and priority tests, that word will be chosen which has been in the memory for the longest period based upon the information stored in the sequence field 384.

For a memory having a particular size in terms of the numbers of words which it is capable of storing, and for a sequence index counter 390 and associated counter field 394 having a particular size in digits per word, it may be theoretically possible to obtain a sequence circuit operation which is not a true indication of sequence. This is possible if a second reset of the ones emitter field 392 occurs before the selection and read out of the entire first generation of words stored prior to the first reset of field 392. The risk of this is greater if there are many words having a high priority. The remedy is to increase the size of the sequence index counter 390 and the field 394. However, a rare occurrence of an over flow of the sequence field apparatus will generally not be serious. This is true because the oldest sequence number which is held over from the first generation will be classed by its zero value in the 392 field as a member of the second generation which will be selected before the new third generation of sequence field numbers which contain the one digit in the 392 field. Accordingly, the word containing the first generation sequence number will generally be read out of the memory along with the words containing the second generation sequence numbers before the next resetting of the field 392 and the commencement of the storage of words containing the fourth generation sequence numbers.

As mentioned above, the data storage portion of the memory system of FIG. 7 which stores data not used for the selection of words to be read out is restricted to a single field 378 of five digits. All of the remaining fields of the memory are devoted to storage of digits upon which the word selection tests are made. However, it will be apparent that other passive data storage fields may be provided in the memory which are interspersed with the association fields and the ordered read out fields. It will be understood also that additional association fields and ordered read out fields may be provided in the memory and that the sizes of these fields as well as the passive data storage fields may be changed and adjusted as desired to achieve the results required. Furthermore, the memory may be adjusted in size to store any required number of words.

An added feature which may be provided in a simple manner in the system of FIG. 7 may be refered to as a priority override feature. An individual priority field column may be assigned to each different priority class and a one digit stored in that column will signify that priority. If all of the words in a particular priority class are to be given an override priority which precedes all other priority classes, all of the ones in the entire column assigned to that priority class are reset to zero. The priority field for each word in that class will then display all zeros which will automatically give that class of words the highest priority. The priority fields of all words in other priority classes will continue to contain a one digit. This is believed to be a very interesting and useful feature for those instances where priorities must be changed.

While the invention has been particularly shown and described with reference to preferred embodiments thereof, it will be understood by those skilled in the art that various changes in form and details may be made therein without departing from the spirit and scope of the invention.

What is claimed is:

1. A memory system having automatic ordered read out of words comprising:

(a) a plurality of binary storage flip-flop arranged in rows for the storage of individual words and having corresponding word flip-flops arranged in columns, (b) an individual ordering control circuit for each row, (1) each of said ordering control circuits comprising a flip-flop condition detection circuit for each flip-flop of said word, (i) said condition detection circuits being connected in cascade from the highest to the lowest order digit positions, (ii) each of said condition detection circuits having an input connection and two output connections for respectively indicating first and second conditions, (iii) one of said conditions being the "zero" condition and the other being the "one" condition, (iv) the first of said condition output connections being connected to provide the input signal to any lower order condition detection circuit of the associated order control circuit, (c) an "all second condition" detection circuit for each column connected to respond to outputs from all of the active condition detection circuits for that column for indicating when all of said active detection circuits are in said second condition, (d) a coincidence circuit for each condition detection circuit connected to receive the second condition output signal therefrom, (1) all of said coincidence circuits being connected to receive the "all second condition" detection signal from the "all second condition" detection circuit of the associated column, (2) each coincidence circuit being operable to provide an output only in response to the concurrent presence of both of said signals (3) and the output of each said coincidence circuit being connected to supply a signal as an alternative to the first condition output of the associated condition detection circuit.

2. A memory system having automatic ordered read out of words proceeding from the lowest to the highest value comprising:

(a) a plurality of binary storage flip-flops arranged in rows for the storage of individual words and having corresponding word flip-flops arranged in columns, (b) an individual ordering control circuit for each row, (1) each of said ordering control circuits comprising a plurality of flip-flop condition detection circuits connected in cascade from the highest to the lowest order digit positions, (i) each of said condition detection circuits having an input connection and two output connections for respectively indicating the "zero" and the "one" condition, (ii) the zero condition output connection being connected to provide the input signal to any lower order condition detection circuit of the associated order control circuit, (c) an "all ones" detection circuit for each column connected to respond to outputs from all of the active condition detection circuits for that column, (d) a coincidence circuit for each condition detection circuit connected to receive the "one" condition output signal therefrom, (1) all of said coincidence circuits being connected to receive the "all ones" detection signal from the "all ones" detection circuit of the associated column, (2) each coincidence circuit being operable to provide an output only in response to the concurrent presence of both of said signals, (3) and the output of each said coincidence circuit being connected to supply a signal as an alternative to the "zero" condition output of the associated condition detection circuit.

3. A memory system for providing storage for words in random positions which is operable to provide a successive read out of words in an order determined by the numerical values of at least a portion of each word stored in at least one field thereof comprising:

(a) a plurality of bit storage flip-flops arranged in rows for the storage of individual words and with corresponding flip-flops for said words arranged to form columns, (b) an individual ordering control circuit for each word position (1) and each ordering control circuit including a flip-flop condition detection circuit for each column of said order determining field, (i) each of said condition detection circuits having an input connection and two output lines and being operable in response to a signal received thereon to supply a signal on one of said output lines indicating a "zero" condition and on the other of said output lines indicating a "one" condition, (ii) The input of each ordering control circuit constituting the input to the highest order condition detection circuit thereof, (iii) the "zero" condition output of each condition detection circuit being connected as the input for any next lower order condition detection circuit of said ordering control circuit (iv) and the "zero" condition output for the lowest order condition detection circuit constituting an ordering control circuit output indicating that the order determining field of the associated word has the lowest value of the active words in memory, (c) an "all ones" detection circuit for each column within said order determining field which is operable in response to outputs indicating an "all ones" condition from all of the active condition detection circuits for that column, (d) a coincidence circuit for each condition detection circuit connected to receive as an input the "one" condition output therefrom, (1) all of said concidence circuits being connected to receive as an input the output of the "all ones" detection circuit of the associated column, (2) each said coincidence circuit being operable to provide an output only in response to the concurrent presence of both of said inputs, (3) and the output of each said coincidence circuit being connected to supply a signal as an alternative to the "zero" condition output of the associated condition detection circuit.

4. A memory system having automatic ordered read out of words proceeding from the highest to the lowest value comprising:

(a) a plurality of binary storage flip-flops arranged in rows for the storage of individual words and having corresponding word flip-flops arranged in columns, (b) an individual ordering control circuit for each row, (1) each of said ordering control circuits comprising a plurality of flip-flop condition detection circuits connected in cascade from the highest to the lowest order digit positions, (i) each of said condition detection circuits having an input connection and two output connections for respectively indicating the "zero" and the "one" condition, (ii) the one condition output connection being connected to provide the input signal to any lower order condition detection circuit of the associated order control circuit, (c) an "all zeros" detection circuit for each column connected to respond to outputs from all of the active condition detection circuits for that column, (d) a coincidence circuit for each condition detection circuit connected to receive the "zero" condition output signal therefrom, (1) all of said coincidence circuits being connected to receive the "all zeros" detection signal from the "all zeros" detection circuit of the associated column, (2) each coincidence circuit being operable to provide an output only in response to the concurrent presence of both of said signals, (3) and the output of each said coincidence circuit being connected to supply a signal as an alternative to the "one" condition output of the associated condition detection circuit.

5. A memory system having automatic ordered read out of words proceeding from one extreme value to the other comprising:

(a) a plurality of binary storage flip-flops arranged in rows for the storage of individual words and having corresponding word flip-flops arranged in columns, (b) an individual ordering control circuit for each row, (1) each of said ordering control circuits comprising a plurality of flip-flop condition detection circuits connected in cascade from the highest to the lowest order digit positions, (i) each of said condition detection circuits having an input connection and two output connections for respectively indicating first and second conditions, (ii) one of said conditions being the "zero" condition and the other being the "one" condition, (iii) the first of said condition output connections being connected to provide the input signal to any lower order condition detection circuit of the associated order control circuit (iv) and said first condition output connection of the lowest order condition detection circuit comprising the ordering control circuit output indicating the extreme value word to be read out next, (c) an "all second condition" detection circuit for each column arranged to indicate the second condition at all of the active condition detection circuits for that column (1) and connected to respond to any one of the first condition outputs from said condition detection circuits for that column for indicating when any of said active detection circuits are in said first condition, (d) a coincidence circuit for each condition detection circuit connected to receive the second condition output signal therefrom, (1) all of said coincidence circuits being connected to receive the "all second condition" detection signal from the "all second condition" detection circuit of the associated column, (2) each coincidence circuit being operable to provide an output only in response to the concurrent presence of both of said signals, (3) and the output of each said coincidence circuit being connected to supply a signal as an alternative to the first condition output of the associated condition detection circuit.

6. A memory system for providing automatic ordered read out of words in a sequence proceeding from one extreme value to the other comprising:

(a) a plurality of binary storage flip-flops arranged in rows for the storage of individual words and having corresponding word flip-flops arranged in columns, (b) an individual ordering control circuit for each row, (1) each of said ordering control circuits comprising a plurality of flip-flop condition detection circuits connected in cascade from the highest to lowest order digit positions, (i) each of said condition detection circuits having an input connection and two output connections gated by the associated flip-flop for respectively indicating first and second conditions, (ii) one of said conditions being the "zero" condition and the other being the "one" condition, (iii) the first of said condition output connections being connected to provide the input signal to any lower order condition detection circuit of the associated order control circuit (iv) and said first condition output connection of the lowest order condition detection circuit comprising the ordering control circuit output indicating the extreme value word to be read out next, (c) an "all second condition" detection circuit for each column arranged to indicate the second condition at all of the active condition detection circuits for that column (1) and connected by means of a series of OR circuits to respond to any one of the first condition outputs from said condition detection circuits for that column for suppressing the operation of said "all second condition" detection circuit, (d) a coincidence circuit for each condition detection circuit connected to receive the second condition output signal therefrom, (1) all of said coincidence circuits being connected to receive the "all second condition" detection signal from the "all second condition" detection circuit of the associated column, (2) each coincidence circuit being operable to provide an output only in response to the concurrent presence of both of said signals, (3) the output of each said coincidence circuit being connected to supply a signal as an alternative to the first condition output of the associated condition detection circuit, (e) an individual word selection input circuit for each of said ordering control circuits, (f) and apparatus responsive to a word selection output from any said ordering control circuit for reading out the associated word and for then disabling the associated word selection input circuit.

7. A memory system including arrangements for ordered read out of words proceeding in sequence from one extreme value to the other comprising:

(a) a plurality of electromechanical switching devices forming binary storage flip-flops arranged in rows for the storage of individual words and having corresponding word flip-flops arranged in columns, (b) an individual ordering control circuit for each row, (1) each of said ordering control circuits comprising a plurality of flip-flop condition detection circuits connected in cascade from the highest to the lowest order digit positions, (i) each of said condition detection circuits comprising a common input connection to two contacts of the associated electromechanical switching devices to provide output connections for respectively indicating first and second flip-flop conditions, (ii) one of said conditions being the "zero" condition and the other being the "one" condition, (iii) the first of said condition output connections being connected to provide the input signal to any lower order condition detection circuit of the associated order control circuit (iv) and said first condition output connection of the lowest order condition detection circuit comprising the ordering control circuit output indicating the extreme value word to be read out next, (c) an "all second condition" detection circuit for each column arranged to indicate the second condition at all of the active condition detection circuits for that column, (1) said "all second condition" circuits each comprising at least one electromechanical switching device connected for energization from a first condition flip-flop contact of any flip-flop in the associated column for response when any of said active condition detection circuits are in said first condition, (d) a coincidence circuit for each condition detection circuit connected to receive the second condition output signal therefrom, (1) all of said coincidence circuits including contacts which are closed in the "all second condition" detection operation of the "all second condition" detection circuit of the associated column, so that each coincidence circuit is operable to provide an output only in response to the concurrent presence of the individual second condition and the "all second condition" signals, (2) and the output of each said coincidence circuit being connected to supply a signal as an alternative to the first condition output of the associated condition detection circuit.

8. A memory system for providing automatic ordered read out of words in a sequence proceeding from one extreme value to the other comprising:

(a) a plurality of binary storage flip-flops arranged in rows for the storage of individual words and having corresponding word flip-flops arranged in columns, (b) a word selection circuit comprising an individual ordering control circuit for each row.

(c) a word rejection circuit for each row, (d) an input circuit for each row connected to supply a current to said word selection circuit and connected to switch said current to said rejection circuit when said word is suppressed, (e) each of said ordering control circuits comprising a plurality of flip-flop condition detection circuits connected in cascade from the highest to the lowest order digit positions, (1) each of said condition detection circuits having an input connection and two output connections gated by the associated flip-flop for respectively indicating first and second conditions, (2) one of said conditions being the "zero" condition and the other being the "one" condition, (3) the first of said condition output connections being connected to provide the input signal to any lower order condition detection circuit of the associated order control circuit (4) and said first condition output connection of the lowest order condition detection circuit comprising the ordering control circuit output indicating the extreme value word to be read out next, (5) the second of said condition output connections being normally connected to carry said word selection circuit current to said rejection circuit, (f) an "all second condition" detection circuit for each column arranged to indicate the second condition at all of the active current carrying condition detection circuits for that column (1) and including a series of OR circuits connected to respond to any one of the first condition outputs from said condition detection circuits for that column for suppressing the operation of said "all second condition" detection circuit, (g) a coincidence circuit for each condition detection circuit connected to receive the "all second condition" signal from the "all second condition" detection circuit of the associated column and operable in response thereto to switch the current in each active second condition output connection from said rejection circuit to said word selection circuit, (h) and apparatus responsive to a combination of a word selection output from any said ordering control circuit and word rejection outputs from rejection circuits at other word levels for reading out the selected word and for then suppressing the word by switching the associated input circuit to supply the input current to the associated rejection circuit.

9. A memory system providing ordered read out of words in a sequence based on information stored as at least part of each word proceedings from one extreme valve to the other comprising:

(a) a plurality of binary storage flip-flops arranged in rows for the storage of individual words and having corresponding word-flip-flops arranged in columns, (b) an individual ordering control circuit for each row, (1) each of said ordering control circuits comprising a plurality of flip-flop condition detection circuits connected in cascade from the highest of the lowest order digit positions, (i) each of said condition detection circuits having an input connection and two output connections gated by the associated flip-flop for respectively indicating first and second conditions, (ii) the first of said condition output connections being connected to provide the input signal to any lower order condition detection circuit of the associated row (iii) and said first condition output connection of the lowest order condition detection circuit comprising the ordering control circuit output indicating the extreme value word, (c) an "all second condition" detection circuit for each column arranged to indicate the second condition at all of the active condition detection circuits for that column, (1) each said "all second condition" detection circuit being connected by means of a series of OR circuits to respond to any one of the first condition outputs from said condition detection circuits for the associated column for suppressing the operation of said "all second condition" detection circuit, (d) a column suppression control for selectively suppressing the operation of the ordered read out circuits with respect to any column which is to be inactive in the sequence determination by suppressing the operation of the "all second condition" detection circuit with respect to that column independent of the existence of the "all second condition,"

(e) a coincidence circuit for each condition detection circuit connected to receive the second condition output signal therefrom, and connected also to receive the "all second condition" detection signal from the "all second condition detection circuit of the associated column, (1) each concidence circuit being operable to provide an output only in response to the concurrent presence of both of said signals, (2) the output of each said coincidence circuit being connected to supply a signal as an alternative to the first condition output of the associated condition detection circuit, (f) an individual work selection input circuit for each of said ordering control circuits, (g) an apparatus responsive to a word selection output from said ordering control circuit for a word for reading out that word and for then disabling the associated word selection input circuit.

10. A memory system including read out control apparatus for providing read out of words on the basis of a combination of association on at least one word field and in an ordered sequence proceeding from one extreme value to the other as determined in at least one other word field comprising:

(a) a plurality of binary storage flip-flops arranged in rows for the storage of individual words and having corresponding word flip-flops arranged in columns, (b) a word selection circuit comprising an individual association control circuit and an individual ordering control circuit for each row, (c) a word rejection circuit for each row, (d) an input circuit for each row connected to supply a current to said word selection circuit and connected to switch said current to said rejection circuit when said word is suppressed (e) each of said association control circuits comprising a two branch comparison circuit in each digit position of said association field, (1) said comparison circuits being connected and arranged to compare binary association information digits with the digits stored in the flip-flops of the association field and to switch the current from the word selection circuit to the word rejection circuit whenever a noncompare condition is detected for any association field flip-flop, (f) each of said ordering control circuits comprising a plurality of flip-flop condition detection circuits connected in cascade from the highest to the lowest order digit positions in said ordered sequence field, (i) each of said condition detection circuits having an input connection and two output connections gated by the associated flip-flop for respectively indicating first and second conditions, (ii) one of said conditions being the "zero" condition and the other being the "one" condition, (iii) the first of said condition output connections being connected to provide the input signal to any lower order condition detection circuit of the associated order control circuit (iv) and said first condition output connection of the lowest order condition detection circuit comprising the ordering control circuit output, (v) the second of said condition output connections being normally connected to carry said word selection circuit current to said rejection circuit, (g) an "all second condition" detection circuit for each column of said ordered sequence field arranged to indicate the second condition at all of the active current carrying condition detection circuits for that column, (1) and including a series of OR circuits connected to respond to any one of the first condition outputs from said condition detection circuits for that column for suppressing the operation of said "all second condition" detection circuit, (h) a concidence circuit for each condition detection circuit connected to receive the "all second condition" detection signal from the "all second condition" detection circuit of the associated column and operable in response thereto to switch the current in each active second condition output connection from said rejection circuit to said word selection circuit, (i) and apparatus responsive to a combination of a word selection output from any said ordering control circuit and word rejection outputs from rejection circuits at other word levels for reading out one selected word and for thereafter suppressing the word by switching the associated input circuit to supply the input current to the associated rejection circuit.

11. A memory system for providing automatic ordered read out of words in a sequence proceeding from one extreme value to a limit value comprising:

(a) a plurality of binary storage flip-flops arranged in rows for the storage of individual words and having corresponding word flip-flops arranged in columns, (b) one of said rows at an extreme end of said memory system comprising a limit value register for storing a limit value beyond which the sequence of read out is to be stopped, (c) an individual ordering control circuit for each row, (1) each of said ordering control circuits comprising a plurality of flip-flop condition detection circuits connected in cascade from the highest to the lowest order digit positions, (i) each of said condition detection circuits having an input connection and two output connections gated by the associated flip-flop for respectively indicating first and second conditions, (ii) one of said conditions being the "zero" condition and the other being the "one" condition, (iii) the first of said condition output connections being connected to provide the input signal to any lower order condition detection circuit of the associated order control circuit (iv) and said first condition output connection of the lowest order condition detection circuit comprising the ordering control circuit output indicating the extreme value word to be read out next.

(d) an "all second condition" detection circuit for each column arranged to indicate the second condition at all of the active condition detection circuits for that column (1) and connected by means of a series of OR circuits to respond to any one of the first condition outputs from said condition detection circuits for that column for suppressing the operation of said "all second condition" detection circuit, (e) a coincidence circuit for each condition detection circuit connected to receive the second condition output signal therefrom, (1) all of said coincidence circuits being connected to receive the "all second condition" detection signal from the "all second condition" detection circuit of the associated column, (2) each coincidence circuit being operable to provide an output only in response to the concurrent presence of both of said signals, (3) the output of each said coincidence circuit being connected to supply a signal as an alternative to the first condition output of the associated condition detection circuit, (f) an individual word selection input circuit for each of said ordering control circuits, (g) read out apparatus for reading out a selected word and for then disabling the associated word selection input circuit, (1) said read out apparatus being operable to read out selected words in response to word selection outputs from said ordering control circuits proceeding from the selected word most distant from said limit value register, (h) and a stop circuit connected to said read out apparatus and connected for response to the word selection output from said limit register for stopping the ordered read out sequence operation when the limit register is the only selected word row.

12. A cryogenic memory system including apparatus for providing ordered read out of words comprising:

(a) a plurality of cryogenic binary storage flip-flops consisting of two cryotron gated alternate branch circuits for single currents arranged in rows for the storage of individual words and having corresponding word flip-flops arranged in columns, (b) an individual ordering control circuit for each row, (1) each of said ordering control circuits comprising a flip-flop condition detection circuit for each flip-flop of said word, (i) said condition detection circuits being connected in cascade from the highest to the lowest order digit positions, (ii) each of said condition detection circuits having an input connection and two output connections gated by cryotrons having control windings connected respectively in the branch circuits of the associated flip-flop for respectively indicating first and second conditions, (iii) one of said conditions being the "zero" condition and the other being the "one" condition, (iv) the first of said condition output connections being connected to provide the input signal to any lower order condition detection circuit of the associated order control circuit, (c) an "all second condition" detection circuit for each column connected to respond to outputs from all of the active condition detection circuits for that column and including series connected cryotrons responsive to said first condition outputs and parallel connected cryotrons responsive to said second condition outputs for indicating when all of said active detection circuits are in said second condition, (d) a coincidence circuit for each condition detection circuit connected to receive the second condition output signal therefrom, (1) all of said coincidence circuits comprising cryotrons having control windings connected to receive the "all second condition" detection signal from the "all second condition" detection circuit of the associated column, (2) each coincidence circuit being operable to provide an output only in response to the concurrent presence of both of said signals (3) and the output of each said coincidence circuit being connected to supply a signal as an alternative to the first condition output of the associated condition detection circuit.

13. A cryogenic memory system including apparatus for providing automatic ordered read out of words in a sequence proceeding from the lowest to the highest value comprising:

(a) a plurality of cryogenic binary storage flip-flops consisting of two cryotron gated alternate branch circuits for single currents arranged in rows for the storage of individual words and having corresponding word flip-flops arranged in columns, (b) an individual ordering control circuit for each row, (1) each of said ordering control circuits comprising a plurality of flip-flop condition detection circuits connected in cascade from the highest to the lowest order digit positions, (i) each of said condition detection circuits having an input connection and two output connections gated by cryotrons having control windings connected respectively in the branch circuits of the associated flip-flop for respectively indicating the "zero" condition and the "one" condition, (ii) said zero condition output connection being connected to provide the input signal to any lower order condition detection circuit of the associated order control circuit (iii) and said zero condition output connection of the lowest order condition detection circuit comprising the ordering control circuit output indicating the lowest value word to be read out next, (c) an "all ones" detection circuit for each column arranged to indicate the ones condition at all of the active condition detection circuits for that column (1) comprising cryotrons at each word level having gate circuits connected in series and having control windings respectively connected in said zero condition connections to respond to any one of the zero condition outputs from said condition detection circuits for that column for suppressing the operation of said "all ones" detection circuit, (d) a coincidence circuit for each condition detection circuit comprising a cryotron having a gate circuit connected to receive the one output signal therefrom, (1) all of said coincidence circuit cryotrons having control windings connected to receive the signal from the "all ones" detection circuit of the associated column, (2) each coincidence circuit being operable in response to the concurrent presence of both of said signals to cause the one output signal to be shifted to supply a signal as an alternative to the zero condition output of the associated condition detection circuit, (e) an individual word selection input circuit for each of said ordering control circuits, (f) and apparatus responsive to word selection outputs from said ordering control circuits for reading out a single word and for then disabling the associated word selection input circuit.

14. A cryogenic memory system for providing automatic ordered read out of words in a sequence proceeding from one extreme value to the other comprising:

(a) a plurality of cryogenic binary storage flip-flops consisting of two cryotron gated alternate branch circuits for single currents arranged in rows for the storage of individual words and having corresponding word flip-flops arranged in columns, (b) a word selection circuit comprising an individual ordering control circuit for each row, (c) a word rejection circuit for each row, (d) an input circuit for each row connected to supply a current to said word selection circuit and connected to switch said current to said rejection circuit when said word is suppressed (e) each of said ordering control circuits comprising a plurality of flip-flop condition detection circuits connected in cascade from the highest to the lowest order digit positions, (1) each of said condition detection circuits having an input connection and two output connections gated by cryotrons having control windings connected respectively in the branch circuits of the associated flip-flop for respectively indicating first and second conditions, (2) one of said conditions being the "zero" condition and the other being the "one" condition, (3) the first of said condition output connections being connected to provide the input signal to any lower order condition detection circuit of the associated order control circuit (4) and said first condition output connection of the lowest order condition detection circuit comprising the ordering control circuit output indicating the extreme value word to be read out next, (5) the second of said condition output connections being normally connected to carry said word selection circuit current to said rejection circuit, (f) an "all second condition" detection circuit for each column arranged to indicate the second condition at all of the active current carrying condition detection circuits for that column (1) comprising a plurality of cryotrons having gate circuits connected in series and having control windings respectively connected in said first condition connections to respond to any one of the first condition outputs from said condition detection circuits for that column for suppressing the operation of said "all second condition" detection circuit, (g) a coincidence circuit for each condition detection circuit comprising a cryotron having a control winding connected to receive the "all second condition" signal from the "all second condition" detection circuit of the associated column and having a cryotron gate circuit operable in response thereto to switch the current in each active second condition output connection from said rejection circuit to said word selection circuit, (h) and apparatus including cryotron switching devices responsive to a combination of a word selection output from any said ordering control circuit and word rejection outputs from rejection circuits at other word levels for reading out a single selected word and for then suppressing the word by switching the associated input circuit to supply the input current to the associated rejection circuit.

15. A memory system providing ordered read out of words in numerical sequence comprising:

(a) cryogenic storage flip-flops arranged in rows for the storage of a word in each row and having corresponding word flip-flops arranged in columns, (b) a word selection circuit for each row comprising an ordering control circuit, (c) a word rejection circuit for each row, (d) an input circuit for each row connected to supply a current to said word selection circuit and connected to switch said current to said rejection circuit when said word is suppressed, (e) each of said ordering control circuits comprising a condition detection circuit for each flip-flop connected in cascade from the highest to the lowest order digit positions, (1) each of said condition detection circuits having an input connection and two output circuit connections containing cryotron gates controlled by control windings in the branches of the associated flip-flop for respectively indicating first and second conditions, (2) one of said conditions being the "zero" condition and the other being the "one" condition, (3) the first of said condition output connections being connected to provide the input signal to any lower order condition detection circuit of the associated order control circuit (4) and said first condition output connection of the lowest order comprising the ordering control circuit output indicating the selected extreme value word, (5) the second of said condition output connections being normally connected through a cryotron gate to carry said word selection circuit current to said rejection circuit, (f) an "all second condition" detection circuit for each column arranged to indicate when all of the active current carrying condition detection circuits for that column are in the second condition (1) and comprising cryotrons at each word level having gate circuits connected in series and having control windings respectively connected in said first condition circuit connections to respond to any one of the first condition outputs from said condition detection circuits for that column for suppressing the operation of said "all second condition" detection circuit, (g) the cryotron gates of said second condition output connections of said condition detection circuits having control windings connected to receive the "all second condition" signal from the "all second condition" detection circuit of the associated column and operable in response thereto to block the current in each active second condition output connection to said rejection circuit, (h) a separate alternate cryotron gated circuit connected to each second condition output connection for carrying said second condition circuit current back to said word selection circuit when said last mentioned cryotron gates are blocked, (i) and apparatus responsive to a combination of word selection outputs from said ordering control circuits and word rejection outputs from rejection circuits at other word levels for reading out a single selected word and for then suppressing the word by switching the associated input circuit to supply the input current to the associated rejection circuit.

16. A memory system for binary information providing an ordered read out of words in sequence proceeding from one extreme value to the other comprising:

(a) an individual ordering control means for each word position row in the memory, (b) means for providing an input signal to each of said ordering control means for all word position rows from which words are to be read out, (c) each said ordering control means comprising a condition detection means for each digit in the word row, (d) each of said condition detection means being active in the presence of an input signal for indicating first and second conditions of the associated digit, (e) one of said conditions being the "zero" condition and the other being the "one" condition, (f) each of said condition detection means for the highest order column being connected to receive said input signal to the associated order control means, (g) each of said condition detection means being operable when active to provide an output signal in response to said first condition, (h) an "all second condition" detection means for each column which is operable in response to the second condition at all of the active condition detection means for that column, (i) each of said active condition detection means being connected for response to the concurrent operation of the associated "all second condition" detection means to provide an output signal, (j) each condition detection means being connected to provide the output signal therefrom as an input signal to any lower order condition detection means of the associated order control means, (k) and the output signal from each condition detection means of the lowest order constituting the output for the associated ordering control means indicating an extreme value word selected to be read out, (l) a read out means operable to read out a single selected word, (m) and means thereafter operable to make that word storage position inactive by suppressing the operation of said input signal means with respect to the associated ordering control means.

No references cited.

MALCOLM A. MORRISON, *Primary Examiner.*